US008580704B2

(12) United States Patent
Lefèvre et al.

(10) Patent No.: US 8,580,704 B2
(45) Date of Patent: Nov. 12, 2013

(54) CATALYST PRECURSORS, CATALYSTS AND METHODS OF PRODUCING SAME

(75) Inventors: Michel Lefèvre, Sainte-Julie (CA); Éric Proietti, Montreal (CA); Frédéric Jaouen, Montpellier (FR); Jean-Pol Dodelet, Sainte-Julie (CA); Allan S. Hay, Montreal (CA)

(73) Assignees: Institut National de la Recherche Scientifique (CA); The Royal Institution for the Advancement of Learning/MCGill University (CA)

( * ) Notice: Subject to any disclaimer, the term of this patent is extended or adjusted under 35 U.S.C. 154(b) by 27 days.

(21) Appl. No.: 13/127,744

(22) PCT Filed: Oct. 2, 2009

(86) PCT No.: PCT/CA2009/001365
§ 371 (c)(1),
(2), (4) Date: Jul. 19, 2011

(87) PCT Pub. No.: WO2010/051619
PCT Pub. Date: May 14, 2010

(65) Prior Publication Data
US 2011/0294658 A1    Dec. 1, 2011

Related U.S. Application Data

(60) Provisional application No. 61/112,844, filed on Nov. 10, 2008.

(51) Int. Cl.
*B01J 35/10* (2006.01)
(52) U.S. Cl.
USPC ............................ 502/185; 502/300; 502/200
(58) Field of Classification Search
None
See application file for complete search history.

(56) References Cited

U.S. PATENT DOCUMENTS

2006/0154812 A1    7/2006   Dufresne et al.

FOREIGN PATENT DOCUMENTS

CN          11099932 A       1/2008
EP          1092472 A1       4/2001
(Continued)

OTHER PUBLICATIONS

O2 Reduction in PEM Fuel Cells: Activity and Active Site Structural Information for Catalysts Obtained by the Pyrolysis at High Temperature of Fe Precursors. M Lefevre and JP Dodelet et al. J Phys Chem N 2000, 104, 11238-11247.*

(Continued)

*Primary Examiner* — Melvin C Mayes
*Assistant Examiner* — Colette Nguyen
(74) *Attorney, Agent, or Firm* — Wilmer Cutler Pickering Hale and Dorr LLP

(57) ABSTRACT

A catalyst precursor comprising (A) a microporous support, (B) a non-noble metal precursor, and (C) a pore-filler, wherein the micropores of the microporous support are filled with the pore-filler and the non-noble metal precursor so that the micropore surface area of the catalyst precursor is substantially smaller than the micropore surface area of the support when the pore-filler and the non-noble metal precursor are absent is provided. Also, a catalyst comprising the above catalyst precursor, wherein the catalyst precursor has been pyrolysed so that the micropore surface area of the catalyst is substantially larger than the micropore surface area of catalyst precursor, with the proviso that the pyrolysis is performed in the presence of a gas that is a nitrogen precursor when the microporous support, the non-noble metal precursor and the pore-filler are not nitrogen precursors is also provided. Methods of producing the catalyst precursor and the catalyst are provided.

13 Claims, 9 Drawing Sheets

(56) References Cited

FOREIGN PATENT DOCUMENTS

| | | |
|---|---|---|
| GB | 667854 A | 3/1952 |
| JP | 2003299955 A | 10/2003 |
| WO | 03/032419 A2 | 4/2003 |
| WO | 03/103832 A2 | 12/2003 |

OTHER PUBLICATIONS

Xia, D., et al. Methanol-tolerant MoN electrocatalyst synthesized through heat treatment of molybdenum tetraphenylporphyrin for four-electron oxygen reduction reaction. Journal of Power Sources 177(2), 296-302 (2008).

Xu, C., et al. Catalytic decomposition of ammonia gas with metal cations present naturally in low rank coals. Fuel, 84, 1957-1967 (2005).

Yang, R., et al. Co—C—N oxygen reduction catalysts prepared by combinatorial magnetron sputter deposition. Journal of the Electrochemical Society 154, A275-A282 (2007).

Yuasa, M. et al. Modifying carbon particles with polypyrrole for adsorption of cobalt ions as electrocatatytic site for oxygen reduction. Chemistry of Materials 17, 4278-4281 (2005).

Zhao, Z. et al. Effect of Na, Ca and Fe on the evolution of nitrogen species during pyrolysis and combustion of model chars. Fuel, 82, 1839-1844 (2003).

Zhong, H., et al. A novel non-noble electrocatalyst for PEM fuel cell based on molybdenum nitride. Electrochemistry Communications 8(5),: 707-712 (2006).

Ziegelbauer, J.M. et al. Direct spectroscopic observation of the structural origin of peroxide generation from co-based pyrolyzed porphyrins for ORR applications. Journal of Physical Chemistry C 112, 8839-8849 (2008).

International Search Report, PCT/CA2009/001365, Dec. 2, 2009. 3 pages.

Bashyam, R. & Zelenay, P. A class of non-precious metal composite catalysts for fuel cells. Nature 443, 63-66 (2006).

Bezerra, C.W.B., et al. A review of Fe—N/C and Co—N/C catalysts for the oxygen reduction reaction. Electrochimica Acta 53(15), 4937-4951 (2008).

Bezerra, C.W.B., et al. A review of heat-treatment effects on activity and stability of PEM fuel cell catalysts for oxygen reduction reaction. Journal of Power Sources 173(2), 891-908 (2007).

Bouwkamp-Wijnoltz, A.L., et al., Electrochemical reduction of oxygen : an alternative method to prepare active CoN4 catalysts. Electrochimica Acta 45(3), (1999).

Charreteur, F., et al. Fe/N/C non-precious catalysts for PEM fuel cells: Influence of the structural parameters of pristine commercial carbon blacks on their activity for oxygen reduction. Electrochimica Acta 53, 2925-2938 (2008).

Costamagna, J. A., et al. In N4-Macrocyclic Metal Complexes (eds. Zagal, J. H., Bedioui, F. & Dodelet, J. P.) 191-254 (Springer, New-York, 2006).

Dodelet, J.P. In N4-Macrocyclic Metal Complexes (eds. Zagal, J.H., Bedioui, F. & Dodelet, J.P.) 83-147 (Spinger, New York, 2006).

Easton, E.B., et al. Fe—C—N oxygen reduction catalysts prepared by combinatorial sputter deposition. Electrochemical and Solid State Letters 9, A463-A467 (2006).

Faubert, G., et al. Heat-treated iron and cobalt tetraphenylporphyrins adsorbed on carbon black : Physical characterization and catalytic properties of these materials for the reduction of oxygen in polymer electrolyte fuel cells. Electrochimica Acta 41(10), 1689-1701 (1996).

Faubert, G., et al. Oxygen reduction catalysts for polymer electrolyte fuel cells from the pyrolysis of FeII acetate adsorbed on 3,4,9,10-perylenetetracarboxylic dianhydride. Electrochim Acta, 44, 2589-2603 (1999).

Garsuch, A. et al. Oxygen reduction behavior of highly porous non-noble metal catalysts prepared by a template-assisted synthesis route. Journal of the Electrochemical Society 155 (3), B236-B243 (2008).

Garsuch, A., et al. Fuel cell studies on a non-noble metal catalyst prepared by a template-assisted synthesis route. Journal of the Electrochemical Society 155, B953-B957 (2008).

Gasteiger, H.A., et al. Activity benchmarks and requirements for Pt, Pt-alloy, and non-Pt oxygen reduction catalysts for PEMFCs. Applied Catalysis B: Environmental 56, 9-35 (2005).

Gouerec, P., et al. Oxygen reduction in acid media catalysed by heat treated cobalt tretraazaannulene supported on an active charcoal : correlations between the performances after longevity tests and the active site configuration as seen by XPS and ToF-SIMS. Journal of Electoanalytical Chemistry 422(1-2), 61-75 (1997).

Gouerec, P., et al. Oxygen reduction in acidic media catalyzed by pyrolyzed cobalt macrocycles dispersed on an active carbon : the importance of the content of oxygen surface groups on the evolution of the chelate structure during the heat treatment. Electrochimica Acta 43(7), 743-753 (1998).

Gupta, S., et al. Heat-treated polyacrylonitrile-based catalysts for oxygen electroreduction. Journal of Applied Electrochemistry 19, 19-27 (1989).

He, P., et al. Oxygen reduction catalysts for polymer electrolyte fuel cells from the pyrolysis of various transition metal acetates adsorbed on 3,4,9,10-perylenetetracarboxylic dianhydride. Journal of New Materials for Electrochemical Systems 2(4), 243-251 (1999).

Hydrogen, Fuel Cells & Infrastructure Technologies Program, Multi-Year Research, Development and Demonstration Plan. (US DOE, 2007); <http://www1.eere.energy.gov./hydrogenandfuelcells/mypp/pdfs/fuel_cells.pdf>. 42 pages.

Jaouen, F. & Dodelet, J.P. Average turn-over frequency of O2 electroreduction for Fe/N/C and Co/N/C catalysts in PEFCs. Electrochimica Acta 52, 5975-5984 (2007).

Jaouen, F. & Dodelet, J.P. Non-noble electrocatalysts for O2 reduction: How does heat treatment affect their activity and structure?Part I. Model for carbon black gasification by NH3: Parametric calibration and electrochemical validation. Journal of Physical Chemistry C 111, 5963-5970 (2007).

Jaouen, F. and J. P. Dodelet, O2 Reduction Mechanism on Non-Noble Catalysts for PEM Fuel Cells. Part I: Experimental Rates of O2 Electroreduction, H2O2 Electroreduction, and H2O2 Disproportionation. J. Phys. Chem. C 113, 15422-15432 (2009).

Jaouen, F., et al. Fe-based catalysts for oxygen reduction in PEMFCs—Importance of the disordered phase of the carbon support. Journal of the Electrochemical Society 153, A689-A698 (2006).

Jaouen, F., et al. Heat-treated Fe/N/C catalysts for O2 electroreduction: Are active sites hosted in micropores? Journal of Physical Chemistry B 110, 5553-5558 (2006).

Jaouen, F., et al. Oxygen reduction catalysts for polymer electrolyte fuel cells from the pyrolysis of iron acetate adsorbed on various carbon supports. Journal of Physical Chemistry B 107, 1376-1386 (2003).

Jaouen, F., et al. Non-noble electrocatalysts for O2 reduction: How does heat treatment affect their activity and structure? Part II. Structural changes observed by electron microscopy, Raman, and mass spectroscopy. Journal of Physical Chemistry C 111, 5971-5976 (2007).

Jasinski, R. A new fuel cell cathode catalyst. Nature 201, 1212-1213 (1964).

Kiros, Y., Metal Porphyrins for Oxygen Reduction in PEMFC. International Journal of Electrochemical Science 2, 285-300 (2007).

Koslowski, U.I., et al. Nature of the Catalytic Centers of Porphyrin-Based Electrocatalysts for the ORR: A Correlation of Kinetic Current Density with the Site Density of Fe—N4 Centers. J. Phys. Chem. C 112, 15356-15366 (2008).

Lalande, G., et al. Catalytic activity and stability of heat-treated iron phthalocyanines for the electroreduction of oxygen in polymer electrolyte fuel cells. Journal of Power Sources 61(1-2), 227-237 (1996).

Lalande, G., et al. Physical, chemical and electrochemical characterization of heat-treated tetracarboxylic cobalt phthalocyanine adsorbed on carbon black as electrocatalyst for oxygen reduction in polymer electrolyte fuel cells. Electrochimica Acta 40(16), 2635-2646 (1995).

Lalande, G., et al. Is nitrogen important in the formulation of Fe-based catalysts for oxygen reduction in solid polymer fuel cells? Electrochim. Acta 42, 1379-1388 (1997).

(56) References Cited

OTHER PUBLICATIONS

Lefevre, M. & Dodelet, J.-P. Fe-based electrocatalysts made with microporous pristine carbon black supports for the reduction of oxygen in PEM fuel cells. Electrochimica Acta 53, 8269-8276 (2008).

Lefevre, M., et al. Activity for O2 reduction of heat-treated Fe/N/C catalysts prepared with carbon black modified by nitrogen-bearing functionalities in ECS, T. Fuller, et al. Editors. 2006, The electrochemical Society: Cancun. p. 201-210.

Lefevre, M., et al. Molecular oxygen reduction in PEM fuel cell conditions: ToF-SIMS analysis of Co-based electrocatalysts. Journal of Physical Chemistry B 109(35), 16718-16724 (2005).

Lefevre, M., et al. O2 reduction in PEM fuel cells : Activity and active site structural information for catalysts obtained by the pyrolysis at high temperature of Fe precursors. Journal of Physical Chemistry B 104(47), 11238-11247 (2000).

Maruyama, J. & Abe, I. Structure control of a carbon-based noble-metal-free fuel cell cathode catalyst leading to high power output. Chemical Communications, 2879-2881 (2007).

Maruyama, et al. Application of nitrogen-rich amino acids to active site generation in oxygen reduction catalyst. Journal of Power Sources 182, 489-495 (2008).

Maruyama, J., et al. Hemoglobin pyropolymer used as a precursor of a noble-metal-free fuel cell cathode catalyst. Journal of Physical Chemistry C 112, 2784-2790 (2008).

Nallathambi, V., et al. Development of high performance carbon composite catalyst for oxygen reduction reaction in PEM Proton Exchange Membrane fuel cells. Journal of Power Sources 183, 34-42 (2008).

Neyerlin, K.C., et al. Determination of catalyst unique parameters for the oxygen reduction reaction in a PEMFC. Journal of the Electrochemical Society 153, A1955-A1963 (2006).

Okada, T., et al. A comparative study of organic cobalt complex catalysts for oxygen reduction in polymer electrolyte fuel cells. Journal of Inorganic and Organometallic Polymers 9(4), 199-219 (1999).

Sawai, K. and N. Suzuki, Heat-treated transition metal hexacyanometallates as electrocatalysts for oxygen reduction insensitive to methanol. Journal of the Electrochemical Society 151(5), A682-A688 (2004).

Schilling, T. and M. Bron, Oxygen reduction at Fe—N-modified multi-walled carbon nanotubes in acidic electrolyte. Electrochimica Acta 53, 5379-5385 (2008).

Sirk, A.H.C., et al. Effect of preparation conditions of sol-gel-derived Co—N—C-based catalysts on ORR activity in acidic solutions. Journal of the Electrochemical Society 155, B592-B601 (2008).

Subramanian, N.P. et al. Studies on Co-based catalysts supported on modified carbon substrates for PEMFC cathodes. Journal of Power Sources 157, 56-63 (2006).

Van Veen, J.A.R. and C. Visser, Oxygen reduction on monomeric transition metal phthalocyanines in acid electrolyte, Electrochimica Acta vol. 25, pp. 921-928 (1979).

Villers, D., et al. Fe-based catalysts for oxygen reduction in PEM fuel cells—Pretreatment of the carbon support. Journal of the Electrochemical Society 151(9), A1507-A1515 (2004).

Wang, B. Recent development of non-platinum catalysts for oxygen reduction reaction. Journal of Power Sources 152 (1), 1-15 (2005).

Wang, P., et al. Oxygen reduction on the electrocatalysts based on pyrolyzed non-noble metal/poly-o-phenylenediamine/carbon black composites: New insight into the active sites. Journal of Electroanalytical Chemistry 611(1-2), 87-95 (2007).

Wood, T.E., et al. Non-precious metal oxygen reduction catalyst for PEM fuel cells based on nitroaniline precursor. Journal of Power Sources 178, 510-516 (2008).

\* cited by examiner

CATALYST PRECURSORS, CATALYSTS AND METHODS OF PRODUCING SAME

CROSS REFERENCE TO RELATED APPLICATIONS

Cross-Reference to Related Applications

This application is a National Entry Application of PCT application No. PCT/CA2009/001365 filed on Oct. 2, 2009 and published in English under PCT Article 21(2), which itself claims benefit of U.S. provisional application Ser. No. 61/112,844 filed on Nov. 10, 2008 now abandoned. All documents above are incorporated herein in their entirety by reference.

FIELD OF THE INVENTION

The present invention relates to catalyst precursors, catalysts, and methods of producing these catalyst precursors and catalysts. More specifically, the present invention is concerned with non-noble metal catalysts. Such materials can be used in oxygen reduction reactions in fuel cells, including acid or alkaline polymer electrolyte membrane fuel cells and metal-air batteries.

BACKGROUND OF THE INVENTION

Clean, efficient and versatile, $H_2$—$O_2$ (air) polymer electrolyte membrane fuel cells (PEMFCs) are seen as worthy alternatives to a wide range of conventional power generation devices such as internal combustion engines, batteries and diesel-fuelled back-up power systems. PEMFCs generate electricity via two electrochemical reactions that involve the oxidation of hydrogen at the anode ($2H_2 \rightarrow 4H^+ + 4e^-$) and the reduction of oxygen at the cathode ($O_2 + 4H^+ + 4e^- \rightarrow 2H_2O$), thus producing only water and heat. Due to the rather low operating temperature of PEMFCs (ca. 80° C.), catalysts play an essential role in boosting the reaction kinetics to produce the desired high power densities.

Today, the only viable electrocatalysts used in PEMFCs are platinum-based. Platinum is considered to be a "noble" metal, such as gold, for example. In PEMFCs, 90% of the platinum is needed at the cathode due to the sluggishness of the oxygen reduction reaction (ORR) compared to the fast hydrogen oxidation reaction at the anode. Despite improved platinum performances, the increasingly prohibitive cost of platinum remains a major obstacle for the commercial viability of PEMFCs.

In addition, the production of platinum in the natural world is rather limited. On the other hand, there are estimations that the demand for platinum as electrode catalyst will increase significantly as the demand for electric cars with fuel cells increases. Therefore, there is a fear of a still further rise in platinum prices. Accordingly, electrode catalysts which can be formed without using noble metals, such as platinum, are desirable.

Research activity into non-noble or non-precious metal catalysts (NPMC) for the ORR has grown considerably since 1964 when Jasinski observed that cobalt phthalocyanine catalyzed the ORR (REFERENCE 1). Such catalysts were first obtained by adsorbing Fe—$N_4$ or Co—$N_4$ macrocycles on a carbon support and pyrolysing the resulting material in an inert atmosphere (REFERENCE 2). Since, NPMC research using metal-$N_4$ macrocycles has continued (REFERENCE 3-5).

A breakthrough was then achieved when it was revealed that these often-expensive macrocycles could, instead, be substituted by individual N and Co precursors (REFERENCE 6). This approach was followed by several groups (REFERENCE 2, 7, 8-17).

One approach in the synthesis of NPMCs for ORR has been to use $NH_3$ as a nitrogen precursor. The catalysts are obtained by wet impregnation of a carbon black with an iron precursor like irons$^{II}$ acetate (FeAc), followed by a heat treatment, i.e. pyrolysis, in $NH_3$. Herein, such electrocatalysts will be referred to as Fe/N/C catalysts. During pyrolysis at temperatures $\geq 800°$ C., $NH_3$ partly gasifies the carbon support, resulting in a mass loss that depends on the duration of the heat treatment (REFERENCE 18). The disordered domains of the carbon support are preferentially gasified (REFERENCE 19-21). As a result, micropores are created in the carbon black particles. The mass loss (30-50 wt %) at which maximum activity is reached corresponds to the largest microporous surface area of the etched carbon, suggesting that these micropores (size $\leq 2$ nm) host the catalytic sites (REFERENCE 19). In addition, the reaction of $NH_3$ with the disordered carbon domains also produces the N-bearing functionalities needed to bind iron cations to the carbon support (REFERENCE 22-23).

Hence it has been proposed that each Fe/N/C catalytic site comprises an iron cation coordinated by four pyridinic functionalities attached to the edges of two graphene planes, each belonging to adjacent crystallites on either side of a slit pore in the carbon support (REFERENCE 19, 23). Thus, four factors have been identified as requirements for producing active Fe-based catalysts for ORR: (i) disordered carbon content in the catalyst precursor (REFERENCE 18); (ii) iron; (id) surface nitrogen and (iv) micropores in the catalyst. Disordered carbon allows for the formation of micropores and nitrogen enrichment during pyrolysis in $NH_3$, Fe and N are essential because they form an integral part of the catalytic site (REFERENCE 2), while micropores are required to host the catalytic site (REFERENCE 19-21).

For NPMCs, it is meaningful to speak in terms of volumetric activity for ORR. Conversion from $A \cdot g^{-1}_{NPMC}$ to $A \cdot cm^{-3}_{electrode}$ is described below. The volumetric activity is the product of the catalytic site density and the activity of a single site. The latter varies with voltage and is an intrinsic property of the catalytic site. Therefore, if the site is unchanged, increased volumetric activity can only be achieved by increasing the site density.

The volumetric catalytic activity of a catalyst may be marginally improved by increasing the Fe content. However, the inventors previously found increased activity only up to a presence of ca. 0.2 wt % Fe, beyond which the activity levels off and eventually decreases (REFERENCE 24). Therefore, a nominal Fe concentration of 0.2 wt % was at that time chosen for impregnation onto pristine non-porous carbon blacks.

Furthermore, when catalysts were prepared using the impregnation method on non-porous carbon black and pyrolysed in pure $NH_3$, the micropore surface area of the resulting catalysts was shown to govern the catalytic activity because the nitrogen and iron content were usually non-limiting (REFERENCE 19).

FeAc was therefore impregnated onto highly microporous carbon supports followed by pyrolysis in $NH_3$. Surprisingly, this did not improve the activity as compared to catalysts made with non-porous carbon supports. Instead, it was concluded that only the micropores created during pyrolysis in $NH_3$ may host catalytic sites (REFERENCE 25). The inventors thus found that the micropores in the as-received microporous carbon blacks do not bear the surface nitrogen necessary to form catalytic sites. Furthermore, since these carbon blacks have little disordered carbon content, surface nitrogen is difficult to add during pyrolysis in $NH_3$.

REFERENCE 26 gives conditions for measuring the volumetric activity of NPMCs in fuel cells.

REFERENCES 18 and 22 disclose the use of different carbon blacks and activated carbon in catalysts of the prior art.

REFERENCES 27 and 28 disclose the use of a carbon pretreated to add nitrogen and/or carbon with a nitrogen-containing molecule with iron acetate in catalysts of the prior art.

REFERENCE 29 discloses the use of iron, cobalt, chromium and manganese in catalysts of the prior art.

REFERENCES 30-38, 9, 39-46, discloses the use of at least the following non-noble metal precursors in catalysts of the prior art: cobalt porphyrin (Co tetramethoxyphenylporphyrin (TMPP)); iron acetate, Fe tetramethoxyphenylporphyrin (TMPP)) on pyrolysed perylene-tetracarboxylic-dianhydride (PTCDA); Fe phthalocyanines; Fe and Co tetraphenylporphyrin; Co phthalocyanines; Mo tetraphenylporphyrin; metal/poly-o-phenylenediamine on carbon black; metal porphyrin; molybdenum nitride; cobalt ethylene diamine; hexacyanometallates; pyrrol, polyacrylonitrile and cobalt; cobalt tetraazaannulene; and cobalt organic complexes.

REFERENCES 29, 56 and 57 report the successful use of $Fe^{II}$ acetate, cobalt acetate, copper acetate, chromium acetate, manganese acetate, nickel acetate, and ferrocene in prior art catalysts.

The present inventors and other authors have successfully used $Fe^{II}$ acetylacetonate, $Fe^{II}$ sulfate, $Fe^{III}$ chloride, $Fe^{III}$ nitrate, $Fe^{II}$ oxalate, $Fe^{III}$ citrate, ChloroFe tetramethoxyphenylporphyrine, cobalt phthalocyanine, iron phthalocyanine, cobalt tetra-aza-annulene in catalysts of the prior art.

The present inventors have successfully used all the compounds between parenthesis and at least one compound of each family bellow in non-noble catalysts of the prior art: Phenanthroline (1,10-phenanthroline, Bathophenanthroline disulfonic acid disodium salt hydrate, 4,7-Diphenyl and 5,6-dimethyl phenanthroline, 4-aminophenanthroline); Phthalocyanine; Porphyrine; Phthalonitrile (4-Amino-phthalonitrile); Melamine; Hexaazatriphenylene; Tetracarbonitrile; Benzene-1,2,4,5-tetracarbonitrile; amino-acids; Polypyrrole; Polyaniline, Bismark Brown; and Bathocuproine (2,9 Dimethyl-4,7-diphenyl-1,10-phenantroline). These results were unpublished before the present and were thus not part of the prior art available to the skilled person.

There remains a need for improved NPMCs to replace the Pt-based electrocatalysts used in PEMFCs.

The present description refers to a number of documents, the content of which is herein incorporated by reference in their entirety.

SUMMARY OF THE INVENTION

In accordance with the present invention, there is provided a catalyst precursor comprising: (A) a microporous support; (B) a non-noble metal precursor; and (C) a pore-filler, wherein the micropores of the microporous support are filled with the pore-filler and the non-noble metal precursor so that the micropore surface area of the catalyst precursor is substantially smaller than the micropore surface area of the support when the pore-filler and the non-noble metal precursor are absent.

There is also provided a method for producing a catalyst precursor, the method comprising: (A) providing a microporous support; a non-noble metal precursor; and a pore-filler; and (B) filling the micropores of the microporous support with the pore-filler and the non-noble metal precursor so that the micropore surface area of the catalyst precursor is substantially smaller than the micropore surface area of the support when the pore-filler and the non-noble metal precursor are absent.

In embodiments of the above catalyst precursor and method of producing same, at least one of the microporous support, the non-noble metal precursor, or the pore-filler is a nitrogen precursor. As noted below, if none of the microporous support, the non-noble metal precursor, or the pore-filler is a nitrogen precursor, then the pyrolysis gas with which the catalyst precursor will be treated should be a nitrogen precursor.

In embodiments of the above catalyst precursor and method of producing same, the microporous support is highly microporous. In embodiments, the microporous support is carbon-based. In embodiments, the microporous support is carbon black or activated carbon.

In embodiments of the above catalyst precursor and method of producing same, the non-noble metal precursor is a precursor of iron or cobalt. In specific embodiments, the non-noble metal precursor is a precursor of iron. In embodiments, the catalyst precursor has an iron loading of about 0.2 wt % or more based on the total weight of the catalyst precursor. In more specific embodiments, the catalyst precursor has an iron loading of about 1 wt % based on the total weight of the catalyst precursor.

In specific embodiments, the non-noble metal precursor is a salt of a non-noble metal or an organometallic complex of a non-noble metal. In more specific embodiments, the non-noble metal precursor is $Fe^{II}$ acetate.

In embodiments of the above catalyst precursor and method of producing same, the pore-filler comprises a polycyclic structure. In specific embodiments, the pore-filler is perylene-tetracarboxylic-dianhydride, 1,10-phenanthroline, perylene tetracarboxylic-diimide, or polyacrylonitrile.

In embodiments of the above catalyst precursor and method of producing same, the non-noble metal precursor and the pore-filler are the same molecule.

In embodiments of the above catalyst precursor and method of producing same, the micropore surface area of the catalyst precursor is at most about 75%, 65%, 55%, 45%, 35%, 25% or 15% of the micropore surface area of the support when the pore-filler and the non-noble metal precursor are absent. In specific embodiments of the above catalyst precursor and method, the micropore surface area of the catalyst precursor is at most about 10% of the micropore surface area of the support when the pore-filler and the non-noble metal precursor are absent.

In embodiments of the above catalyst precursor and method of producing same, the pore-filler/microporous support mass ratio is 50:50.

In embodiments of the above catalyst precursor and method of producing same, the micropores of the microporous support are filled with the pore-filler and the non-noble metal precursor by ballmilling or resonant acoustic mixing with or without a grinding medium. In specific embodiments, the ballmilling is planetary ballmilling.

For certainty, in embodiments of the above method for producing a catalyst precursor, the catalyst precursor is as described above.

There is also provided a catalyst comprising the above-described catalyst precursor, wherein the catalyst precursor has been pyrolysed so that the micropore surface area of the catalyst is substantially larger than the micropore surface area of catalyst precursor, with the proviso that the pyrolysis is performed in the presence of a gas that is a nitrogen precursor when the microporous support, the non-noble metal precursor and the pore-filler are not nitrogen precursors.

Finally, there is also provided a method of producing a catalyst, the method comprising (A) providing a catalyst precursor comprising a microporous support; a non-noble metal precursor; and a pore-filler, wherein the micropores of the microporous support are filled with the pore-filler and the non-noble metal precursor so that the micropore surface area of the catalyst precursor is substantially smaller than the micropore surface area of the support when the pore-filler and the non-noble metal precursor are absent; and (B) pyrolyzing the catalyst precursor so that the micropore surface area of the catalyst is substantially larger than the micropore surface area of catalyst precursor, with the proviso that the pyrolysis is performed in the presence of a gas that is a nitrogen precursor when the microporous support, the non-noble metal precursor and the pore-filler are not nitrogen precursors.

In embodiments of the above catalyst and method for producing same, the micropore surface area of the catalyst is at least half (50%), 60%, 70%, 75% or 80% of the micropore surface area of the support when the pore-filler and the non-noble metal precursor are absent. In specific embodiments, the micropore surface area of the catalyst is at least three-quarters (75%) of the micropore surface area of the support when the pore-filler and the non-noble metal precursor are absent.

In embodiments of the above catalyst and method for producing same, the mass loss during pyrolysis is about equal to the pore-filler loading in the catalyst precursor (in weight % based on the total weight on the catalyst precursor).

In embodiments of the above catalyst and method for producing same, the catalyst has a nitrogen content of about 0.5 wt % or more based on the total weight of the catalyst.

In embodiments of the above catalyst and method for producing same, the catalyst is an oxygen reduction catalyst, a catalyst for the disproportionation of hydrogen peroxide or a catalyst for the reduction of $CO_2$. In specific embodiments, the catalyst is an oxygen reduction catalyst.

In embodiments of the above catalyst and method for producing same, the pyrolysis is performed in a nitrogen-containing reactive gas or vapor. In specific embodiments, the nitrogen-containing reactive gas or vapor is $NH_3$.

In embodiments of the above catalyst and method for producing same, the pyrolysis is performed in an inert gas. In embodiments, the inert gas is argon.

In specific embodiments of the above catalyst and method for producing same, a second pyrolysis in a nitrogen-containing reactive gas or vapor is performed following the pyrolysis performed in the inert gas. In embodiments, the nitrogen-containing reactive gas or vapor for the second pyrolysis is $NH_3$.

In embodiments of the above catalyst and method for producing same, the pyrolysis (either the first and/or the second one if applicable) is performed at a temperature greater than about 600° C.

For certainty, in embodiments of the above method for producing a catalyst, the catalyst precursor and/or the catalyst are as described above.

DETAILED DESCRIPTION OF THE INVENTION

It is an object of the present invention to provide non-precious (non-noble) metal catalysts (NPMCs) for the oxygen reduction reaction (ORR) in polymer electrolyte membrane fuel cells (PEMFCs). Such catalyst may be referred to as a catalyst of the type metal/N/C.

The present inventors were able to increase the number of catalytic sites on the carbon of such NPMCs using a microporous carbon (which had already lost most of its disordered carbon during its manufacturing), as a starting material. More specifically, the micropores of this microporous carbon were filled with a pore-filler (and non-noble metal precursors). When reacting during subsequent pyrolysis, the pore-filler and non-noble metal precursor produce catalytic sites exactly where they are needed, i.e. in the micropores of the carbon substrate.

The obtained catalysts thus contain a high density of active sites. There may be different kinds of active sites in a same catalyst but all active sites are believed to be as follows. First, because of the use of pore-filler, each active site contains a carbon poly-aromatic structure whose carbon atoms originate from the pore-filler (see FIG. 1). The active sites contain at least one non-noble metal atom and when there is more than one non-noble metal atom, these non-noble metal atoms can be of same or different nature. The active sites also contain at least about four nitrogen atoms. Without being bound by theory, it is believed that the nitrogen atoms are bound to the carbon atoms originating from the pore-filler and/or to the metal atom(s), resulting in pyridinic-type or pyrrolic-type N atoms. It is also believed that the center of each active site is somewhat similar to the center of porphyrin or phthalocyanine molecules, for which all nitrogen atoms are of the pyrrolic-type. Finally, it is believed that the active sites have an electronic contact with the walls of the micropores (see FIG. 1).

The tests presented below have revealed that catalysts obtained using this procedure have an activity in a fuel cell of 10 to 100 times higher than prior art catalysts obtained by simple adsorption or impregnation on carbon. It is believed that the components that have been successfully used in such prior art catalysts that were obtained by simple adsorption or impregnation (such as the microporous supports, the non-noble metal precursor, the pyrolysis gas, and the like) will also be useful in the catalysts of the invention.

Turning now to the present invention in more detail, there is provided a catalyst precursor comprising: (A) a microporous support; (B) a non-noble metal precursor; and (C) a pore-filler, wherein the micropores of the microporous support are filled with the pore-filler and the non-noble metal precursor so that the micropore surface area of the catalyst precursor is substantially smaller than the micropore surface area of the support when the pore-filler and the non-noble metal precursor are absent.

As used herein a "catalyst" means a substance that initiates or facilitates a chemical reaction; a substance that boosts the kinetics of a given reaction. A "catalyst precursor" is a substance from which a catalyst can be produced by pyrolysis. Herein, "pyrolysis" means the transformation of a substance into one or more other substances by heat in the presence or absence of a gas (vacuum). As explained above, in the present invention, the pore-filler in the catalyst precursor react during pyrolysis to produce the desired catalytic sites in the catalyst.

As noted above, the catalyst precursors of the invention comprise a microporous support. As used herein, a microporous support is a support comprising micropores. For example, a microporous support may have a micropore surface area of more than about 100 $m^2$/g. Herein, "micropores" refer to pores having a size≤2 nm. Most microporous supports usually also comprise mesopores (between 2 and 50 nm in size) and macropores (having a size>50 nm). As such, microporous supports have a "total" surface area, which is provided by the micropores, the mesopores and the macropores. As used herein the "micropore surface area" of a substance is the surface area of this substance provided by its micropores. The "total" surface area, micropore surface area, mesopore surface area and macropores surface area can be determined by methods well known in the art. For example, by measuring the $N_2$-adsorption isotherm and analyzing it with the Brunauer Emett Teller (BET) equation and by applying non-local density functional theory using a slit-pore model (Quantachrome software) to determine pore size distribution.

In embodiments, the microporous support is a highly microporous support. For example, a "highly microporous support" may be a microporous support having a micropore surface area of more than about 500 $m^2/g$.

As will be appreciated by the person of skill in the art, the exact nature of the microporous support is of little importance to the invention as long as it comprises micropores. When the catalyst is for use in fuel cells, the microporous support will be conductive or able to be made conductive by methods known to persons of skill in the art. A non-conductive microporous support may be used, if it can be removed after fabrication of the catalytic sites in its micropores, e.g. by acid leaching of the non-conductive support, while leaving intact a skeleton of carbon-based material with high site density. A non-limiting example of such a process is the use of microporous silicon dioxide and its acid leaching by hydrofluoric acid (HF). Hydrofluoric acid is known to not attack such non-noble metal active sites (REFERENCE 49). Another non-limiting example of conductive microporous support is a metal organic framework (MOF). The latter will decompose upon pyrolysis and thus leave the desired skeleton of carbon-based material.

In embodiments, the microporous or highly microporous supports are carbon-based. Such carbon-based supports can be carbon blacks, activated carbons, carbon nanotubes or nanostructures, carbons derived from metallic carbides or oxides or from the pyrolysis of polymers, or from any other method used to obtain highly microporous carbons. In other embodiments, metal organic frameworks may also be used as microporous supports. All the microporous supports may be used as mixtures if desired.

In embodiments, the microporous support may be a nitrogen precursor. As used herein, a "nitrogen precursor" is a molecule or substance that provides one or more nitrogen atoms to the catalyst after pyrolysis.

As noted above, the catalyst precursors of the invention comprise a non-noble metal precursor. It is to be understood that a mixture of non-noble metal precursors can be used. Any non-noble metal precursor known to the skilled person to be useful in catalysts of the prior art (i.e. those produced by adsorption or impregnation) may be used.

As used herein, a "non-noble metal" is a metal other than a noble metal. Noble metals are usually considered by the persons of skill in the art to be ruthenium, rhodium, palladium, osmium, iridium, platinum, and gold.

Examples of the non-noble metal include metals having atomic numbers between 22 and 32, between 40 and 50 or between 72 and 82, with the exclusion of atomic numbers 44-47 and 75-79. In embodiments, the non-noble metal is iron, cobalt, copper, chromium, manganese or nickel. In specific embodiments, the non-noble metal is iron or cobalt. In more specific embodiments, the non-noble metal is iron.

In embodiments, the catalyst precursor comprises between about 0.05 and about 5.0 wt % of the non-noble metal based on the total weight of the catalyst. In embodiments, the catalyst precursor has a non-noble metal content, as provided by the non-noble metal precursor, of about 0.2, 0.5, 1.0, 2.5, 3.0, 3.5, 4.0, or 4.5 wt % or more based on the total weight of the catalyst. In embodiments, the catalyst precursor has a non-noble metal content, as provided by the non-noble metal precursor, of about 5.0, 4.5, 4.0, 3.5, 3.0, 2.5, 2.0, 1.5, 1.0, or 0.5 wt % or less based on the total weight of the catalyst.

In embodiments, the catalyst precursor has an iron loading of about 0.2 wt % or more based on the total weight of the catalyst precursor. In more specific embodiments, the catalyst precursor has an iron loading of about 1 wt % based on the total weight of the catalyst precursor.

As used herein, a "non-noble metal precursor" is a molecule that provides a non-noble metal atom to the catalyst during pyrolysis. It is to be understood that a non-noble metal precursor may contain only one non-noble metal or a mixture of several non-noble metals. As noted above, the active sites of the catalyst of the invention comprise at least one non-noble metal atom.

The non-noble metal precursor may be organometallic or inorganic.

In embodiments, the non-noble metal precursor may be a salt of the non-noble metal or an organometallic complex of the non-noble metal. Generally, any metal precursor of size<2 nm, or more generally of a size that allows it to be inserted or forced in the micropores, would be suitable for use in the present invention. Non-limiting examples of non-noble metal precursors include the following broad classes with more specific examples in each class given between parentheses:

Metal acetates ($Fe^{II}$ acetate, cobalt acetate, copper acetate, chromium acetate, manganese acetate, nickel acetate);
Metal acetylacetonate ($Fe^{II}$ acetylacetonate);
Metal sulfates ($Fe^{II}$ sulfate);
Metal chlorides ($Fe^{III}$ chloride);
Metal nitrates ($Fe^{III}$ nitrate);
Metal oxalates ($Fe^{II}$ oxalate);
Metal citrates ($Fe^{III}$ citrate);
Fe(II) ethylene diammonium sulfate;
Metal porphyrins (Fe tetramethoxyphenylporphyrin, Fe 4-hydroxy-phenyl porphyrin, mesotetra-phenyl Fe porphyrin, octaethyl Fe porphyrin, Fe pentafluorophenyl porphyrin);
Metallocene (Ferrocene, cobaltocene);
Metal—phthalocyanine (cobalt phthalocyanine, iron phthalocyanine);
Tetra-aza-annulene (cobalt tetra-aza-annulene);
Metal oxides;
Metal nitrides;
Metal carbides;
Metal sputtered over the microporous support; and
Mixtures of the above.

Other non-limiting examples of non-noble metal precursors include:
cobalt porphyrin: Co tetramethoxyphenylporphyrin (TMPP);
iron acetate, Fe tetramethoxyphenylporphyrin (TMPP) on pyrolysed perylene-tetracarboxylic-dianhydride (PTCDA);
Fe phthalocyanines;
Fe and Co tetraphenylporphyrin;
Co phthalocyanines;
Mo tetraphenylporphyrin;
metal/poly-o-phenylenediamine on carbon black;
metal porphyrin;
molybdenum nitride;
cobalt ethylene diamine;
hexacyanometallates;
pyrrol, polyacrylonitrile and cobalt;

cobalt tetraazaannulene; and
cobalt organic complexes.

In specific embodiments, the non-noble metal precursor is $Fe^{II}$ acetate (FeAc).

In embodiments, the non-noble metal precursors may also be a nitrogen precursor.

As noted above, the catalyst precursors of the invention comprise a pore-filler. It is to be understood that a mixture of pore-fillers can be used. It is also to be understood that the non-noble metal precursor may be the pore-filler, i.e. the non-noble metal precursor and the pore-filler may be the same molecule.

As used herein, a "pore-filler" is a molecule that (1) is small enough to enter (or be forced in) and fill the micropores of the microporous support and (2) is carbon-based (i.e. organic) so that it reacts during pyrolysis to produce in the micropores a carbon poly-aromatic structure whose carbon atoms originate from the pore-filler as illustrated in FIG. 1. As will be appreciated by the person of skill in the art, the exact nature of the pore-filler has therefore little importance to the present invention as long as the pore-filler fulfills the above-noted requirements and roles.

In embodiments, the pore-filler may comprise a polycyclic structure, i.e. a structure made of rings (loops formed by a series of connected carbon atoms), preferably aryl rings such as $C_6$ rings, for example benzene. These rings may more easily construct active sites and extend the graphite platelets that are found on the edge of the graphitic crystallites within the microporous support to provide the desired carbon poly-aromatic structure in the micropores of the microporous support.

Different types of pore-fillers may be used. A first type comprises molecules that contain carbon, but that do not contain nitrogen atoms. Non-limiting examples of classes of such pore-fillers include polycyclic aromatic hydrocarbons or their derivatives. Non-limiting examples of pore-filler in these classes include perylene or perylene tetracarboxylic dianhydride.

A second type of pore-filler comprises molecules that contain both carbon and nitrogen atoms in their structure. Non-limiting examples of classes of such pore-fillers include phenanthrolines, melamine and cyanuric acid.

A last type of pore-filler comprises molecules that contain carbon, nitrogen atoms and at least one metal atom in their molecular structure. Non-limiting examples of classes of such pore-fillers include metal-phenanthroline complexes, metal-phthalocyanines, and metalporphyrins.

It is to be understood that the pore-filler may be any combination of pore-fillers from the first, second and/or third above-described types of pore-fillers.

In embodiments, the pore-filler may be a nitrogen precursor.

Non-limiting examples of pore-fillers that also are nitrogen precursors include the following broad classes with specific examples given between parenthesis:

Phenanthroline (1,10-phenanthroline, Bathophenanthroline disulfonic acid disodium salt hydrate, 4,7-Diphenyl and 5,6-dimethyl phenanthroline, 4-aminophenanthroline);
Phthalocyanine;
Porphyrine;
Pyrazine (Tetra 2 pyridinyl pyrazine, dihydropyridylpyridazine);
Phthalonitrile (4-Amino-phthalonitrile);
Pyridine (2,2':6',2"-Terpyridine, 4'-(4-Methylphenyl)-2,2': 6',2"-terpyridine, 6,6"-Dibromo-2,2':6',2"-terpyridine, 6"-Dibromo-2,2':6',2"-terpyridine, aminopyridines)
Melamine;
Tetra-aza-annulene;
Hexaazatriphenylene;
Tetracarbonitrile;
Benzene-1,2,4,5-tetracarbonitrile
6-Pyridin-2-yl-[1,3,5]triazine-2,4-diamine;
All amino-acids;
Polypyrrole; and
Polyaniline.

Non-limiting examples of pore-fillers that do not contain nitrogen atoms and are thus not nitrogen precursors include the following broad classes with specific examples given between parenthesis Perylene [perylene-tetracarboxylic-dianhydride (PTCDA)];
Cyclohexane;
Benzene;
Toluene;
Pentacene;
Coronene;
Graphite transformed into disordered carbon of size<2 nm by ballmilling;
Polycyclic aromatics (including perylene, pentacene, coronene, etc.); and
Coal tar or petroleum pitch (these are raw materials for a commercial process for carbon fiber production and are high in polycyclic aromatics).

In embodiments, the pore-filler is perylene-tetracarboxylic-dianhydride, 1,10-phenanthroline, perylene tetracarboxylic-diimide, or polyacrylonitrile.

As described above, the pore-filler enters and fills the micropores of the microporous support. In the catalyst precursor of the invention, the micropores of the microporous support are filled with the pore-filler and the non-noble metal precursor. As used herein, "the micropores are filled" does not mean that all the micropores are completely full, it rather means that a substantial portion of the micropores are at least partially filled. The micropores may be considered as being filled if for example 75% or more of them are completely full and 25% or less of them are empty or if 75% or more of them is mostly (at least half) full.

One observable effect of the micropores being filled is that the micropore surface area of the catalyst precursor becomes substantially smaller than the micropore surface area of the support when the pore-filler and the non-noble metal precursor are absent. Indeed, as can be seen from FIG. 1 and FIG. 4, filled (or even partially filled) micropores have a smaller surface area than empty micropores. Therefore, the micropore surface area of the catalyst precursor where the micropores are filled will be substantially smaller than the micropore surface area of the microporous support with empty micropores.

In embodiments, the micropore surface area of the catalyst precursor is at most about 75% of the micropore surface area of the support when the pore-filler and the non-noble metal precursor are absent. In more specific embodiments, the micropore surface area of the catalyst precursor is at most about 60%, 50%, 40%, 30%, 20%, or 10% of the micropore surface area of the support when the pore-filler and the non-noble metal precursor are absent.

In embodiments, the pore-filler/microporous support mass ratio is 50:50 (as calculated using the weight of the pore-filler and the weight of the microporous support in the catalyst precursor).

The present invention also relates to a catalyst comprising the above catalyst precursor, wherein the catalyst precursor has been pyrolysed so that the micropore surface area of the catalyst is substantially larger than the micropore surface area of catalyst precursor, with the proviso that the pyrolysis is performed in the presence of a gas that is a nitrogen precursor when the microporous support, the non-noble metal precursor and the pore-filler are not nitrogen precursors.

As explained above, it is believed that the active catalytic sites of the present catalyst comprise a carbon poly-aromatic structure whose carbon atoms originate from the pore-filler, at least one non-noble metal atom and at least four nitrogen atoms. There must therefore be nitrogen atoms provided to the catalyst. These nitrogen atoms can be provided by the microporous support, the non-noble metal precursor, the pore-filler and/or the pyrolysis gas. In this case, these components are also nitrogen precursor as explained above.

When the microporous support, the non-noble metal precursor and the pore-filler are not nitrogen precursors, the necessary nitrogen atoms are provided by a gas used during pyrolysis. Therefore in that case, the gas itself is a nitrogen precursor.

As explained above, in the present invention, the pore-filler of the catalyst precursor is believed to react during pyrolysis to produce the desired catalytic sites in the catalyst. More specifically, pyrolysis of the catalyst precursor causes the pore-filler to react and produce a carbon poly-aromatic structure whose carbon atoms originate from the pore-filler in the micropores. This results in the construction of active catalytic sites and the extension of the graphite platelets that are found on the edge of the graphitic microporous support. The pyrolysis also causes the non-noble metal precursor and the nitrogen precursor (be it the microporous support, the non-noble metal precursor, the pore-filler or the gas used for pyrolysis) to react and give up their non-noble metal and nitrogen atoms to the catalytic site. The active catalytic sites are thus formed from the carbon from the pore-filler, the nitrogen from the nitrogen precursor and the non-noble metal from the non-noble metal precursor. This whole process is illustrated in FIG. 1. More detail on the pyrolysis procedure will be given below.

As can be seen from FIG. 1, as the pore-filler, the nitrogen precursor and the non-noble metal react (i.e. decompose and partially go away) during pyrolysis, the micropores of the microporous support are more or less restored. Therefore, the micropore surface area of the catalyst becomes substantially larger during pyrolysis. In other words, the micropore surface area of the catalyst is substantially larger than the micropore surface area of catalyst precursor. In the extreme, the micropore surface area of the catalyst may be almost as high as the micropore surface area of the microporous support when pore-filler and the non-noble metal precursor were absent.

In embodiments, the micropore surface area of the catalyst is at least about 50% of the micropore surface area of the support when the pore-filler and the non-noble metal precursor are absent. In embodiments, the micropore surface area of the catalyst is at least about 60%, 70%, 75% or 80% of the micropore surface area of the support when the pore-filler and the non-noble metal precursor are absent.

As such, it should be understood that the pyrolysis cause a loss of mass. The catalyst obtained after pyrolysis is lighter than the catalyst precursor. In embodiments, the mass loss during pyrolysis is about equal to a pore-filler loading in the catalyst precursor (in weight % based on the total weight on the catalyst precursor).

The non-noble metal content of the catalyst after pyrolysis may be measured by methods known in the art, for example neutron activation analysis.

The catalyst may comprise between about 0.5 to about 10.0 wt % of the nitrogen based on the total weight of the catalyst.

In embodiments, the catalyst has a nitrogen content, as provided by the nitrogen precursor, of about 0.5, 1.0, 2.0, 3.0, 4.0, 5.0, 6.0, 7.0, 8.0, or 9.0 wt % or more based on the total weight of the catalyst. In embodiments, the catalyst has a nitrogen content, as provided by the nitrogen precursor, of about 9.0, 8.0, 7.0, 6.0, 5.0, 4.0, 3.0, 2.0, 1.0 wt % or less based on the total weight of the catalyst. This nitrogen content may be measured by methods known in the art, for example, x-ray photoelectron spectroscopy.

If the microporous support is carbon-based, the carbon content is usually about 80 wt % or more based on the total weight of the catalyst. The catalyst may comprise between about 80 and about 99.9 wt % of carbon. It is to be noted that carbon usually comprises some oxygen (usually between 0.5 and 5% wt). If the microporous support does not contain carbon, the carbon content of the catalyst may be low since the carbon content will be provided only by from the pore-filler (and optionally the non-noble metal precursor) used to fill the microporous support.

In embodiments, the catalyst is an oxygen reduction catalyst, a catalyst for the disproportionation of hydrogen peroxide or a catalyst for the reduction of $CO_2$. Indeed, it is believed that the present catalysts will be useful for the disproportionation of hydrogen peroxide and the reduction of $CO_2$ because it is known for non noble metal catalysts obtained from heat treatment or without heat treatment (metal-$N_4$ molecules as phthalocyanines) that the activity for the $O_2$ electro-reduction reaction and for the chemical disproportionation of $H_2O_2$ follow the same trend, i.e. if a catalyst shows high activity for one reaction, it will show high activity for the other reaction as well (REFERENCE 50). This fact has also been verified by the present inventors and improved $H_2O_2$ disproportionation reaction has been measured on a catalyst of the invention. Further, it is also known that electroreduction of $CO_2$ is catalyzed by metal macrocycles in which a metal ion is coordinated to 4 nitrogen atoms located in a polyaromatic frame, a structure similar to that proposed for the present catalytic sites used for the reduction of oxygen (REFERENCE 51).

In more specific embodiments, the catalyst is an oxygen reduction catalyst. Such a catalyst will be useful at the cathode of various low temperature fuel cells, including principally polymer electrolyte membrane (PEM) such as $H_2/O_2$ polymer electrolyte membrane fuel cells, direct alcohol fuel cells, direct formic acid fuel cells and even alkaline fuel cells. Such a catalyst may also be useful at the cathode of various primary and secondary metal-air batteries, including zinc-air batteries.

The present invention also relate to methods of producing the above-described catalyst precursors and catalysts.

Therefore, the present invention relates to a method for producing a catalyst precursor, the method comprising (A) providing a microporous support; a non-noble metal precursor; and a pore-filler; and (B) filling the micropores of the microporous support with the pore-filler and the non-noble metal precursor so that the micropore surface area of the catalyst precursor is substantially smaller than the micropore surface area of the support when the pore-filler and the non-noble metal precursor are absent.

It should be noted that prior art methods of adding nitrogen and/or non-noble metal precursors to the support did not result in the filling of the micropores as in the present invention. Indeed, the prior art methods for adding these nitrogen and/or non-noble metal precursors to catalyst precursors typically involved impregnation or adsorption. There are inherent solubility and adsorbability limitations to these methods that prevent the filling of the micropores so that that the micropore surface area of the catalyst precursor is substantially smaller than the micropore surface area of the support when the pore-filler and the non-noble metal precursor are absent. Furthermore, in the prior art, the nitrogen and/or non-noble metal precursors were sometimes added to non-microporous supports to produce catalyst precursors.

In the present invention, the addition of the pore-filler and the non-noble metal precursors to the microporous support is carried out so that the micropores of the support are filled and the micropore surface area of the catalyst precursor is substantially smaller than the micropore surface area of the support when the pore-filler and the non-noble metal precursor are absent. The limitation associated with the prior art impregnation/adsorption methods are thus overcome as the micropores filled using different methods. Non-limiting examples of such methods include any form of ballmilling or reactive ballmilling, including but not limited to planetary ballmilling, and resonant acoustic mixing.

Planetary ballmilling is a low-energy material processing technique involving a container with grinding media that rotates in a planet-like motion. It uses both friction and impact effects to force the pore-filler and the non-noble metal precursor into the micropores of the microporous support, while leaving its microstructure relatively unaffected. The ballmilling may be performed on dry powders of non-noble metal precursor, the pore-filler and the microporous support. Alternatively, ballmilling may be performed in wet conditions with the non-noble metal precursor and the pore-filler in solution and the microporous support in suspension in this solution.

Resonant mixing is a method that uses low-frequency high-intensity sound energy for mixing. It may be carried out with or without grinding media.

Therefore, in embodiments of the present invention, the micropores of the microporous support are filled with the pore-filler and the non-noble metal precursor by ballmilling or by acoustic mixing with or without grinding media. In more specific embodiments, the ballmilling is planetary ballmilling.

It is to be understood that the non-noble metal precursor and the pore-filler may be introduced in the micropores of the microporous support either together or separately.

The present invention also relates to a method of producing a catalyst, the method comprising (A) providing a catalyst precursor comprising a microporous support; a non-noble metal precursor; and a pore-filler, wherein the micropores of the microporous support are filled with the pore-filler and the non-noble metal precursor so that the micropore surface area of the catalyst precursor is substantially smaller than the micropore surface area of the support when the pore-filler and the non-noble metal precursor are absent; and (B) pyrolyzing said catalyst precursor so that the micropore surface area of the catalyst is substantially larger than the micropore surface area of catalyst precursor, with the proviso that the pyrolysis is performed in the presence of a gas that is a nitrogen precursor when the microporous support, the non-noble metal precursor and the pore-filler are not nitrogen precursors.

The atmosphere in which the pyrolysis is performed may be:
  a nitrogen-containing reactive gas or vapor, non-limiting examples of which being $NH_3$, HCN, and $CH_3CN$;
  an inert gas, non-limiting examples of which being $N_2$, Ar, and any other inert gas or vapor; or
  a mixture of a nitrogen-containing reactive gas or vapor and an inert gas.

As used herein a nitrogen-containing reactive gas or vapor is a nitrogen-containing gas or vapor that will react during pyrolysis to provide a nitrogen atom to the catalyst. A non-limiting example of a nitrogen-containing gas or vapor that does not so react is $N_2$.

As used herein, an inert gas is a gas that will not react with the catalyst precursor/catalyst at the pyrolysis temperature, an example of which is argon.

Therefore, in embodiments the pyrolysis is performed in a nitrogen-containing reactive gas or vapor. In specific embodiments, the nitrogen-containing reactive gas or vapor is $NH_3$.

In other embodiments, the pyrolysis is performed in an inert gas. In embodiments, the inert gas is argon.

In embodiments where the pyrolysis is performed in an inert gas, a second pyrolysis in a nitrogen-containing reactive gas or vapor is performed following the pyrolysis performed in the inert gas.

As explained above however, there must be nitrogen atoms provided to the catalyst. These nitrogen atoms can be provided by the microporous support, the non-noble metal precursor, the pore-filler and/or the gas used for pyrolysis. When the microporous support, the non-noble metal precursor and the pore-filler are not nitrogen precursors, the necessary nitrogen atoms must be provided by the gas used during pyrolysis (either the first one, or the second if present). Therefore in that case, the pyrolysis gas itself is a nitrogen precursor. In specific embodiments, the gas that is a nitrogen precursor is a nitrogen-containing reactive gas or vapor, non-limiting examples thereof being $NH_3$, HCN, and $CH_3CN$.

The time and temperature required for the pyrolysis will be easily determined by the person of skill in the art. More specifically, the pyrolysis may be performed at temperatures ranging from about 300 to about 1200° C. In specific embodiments, the pyrolysis is performed at a temperature greater than about 600° C.

Optionally, a final pyrolysis under $H_2$ may be carried out to eliminate excess heteroatoms like (N, O, S, etc . . . ) in the catalyst if desired.

Optionally, acid etching may be used to remove excess non-noble metal before or after any pyrolysis.

Post-pyrolysis ballmilling can optionally be carried out to control particle size formed during the pyrolysis.

For use in a fuel cell, the catalyst is processed in order to form part of the cathode of the fuel cell. This is typically accomplished by thoroughly mixing the catalyst and an ionomer like Nafion. The Nafion to catalyst mass ratio has to be adjusted and depends on the catalyst, but can be easily determined by the person of skill in the art. The optimal ratio may range between about 1 and about 4. Given the fact that the present catalysts are much less expensive than noble metal or platinum-based catalysts, the current density of the fuel cell may be increased by increasing the loading of the former with little effect on cost. Therefore, the loading of present catalysts may be increased until mass transport losses become unacceptable.

If the electron conductive properties of the obtained catalysts are not sufficient for optimal performance in fuel cell, a given ratio of a conductive powder [carbon black or any electron conductive powder that does not corrode in acid medium (for all PEM fuel cells) or alkaline medium (for alkaline fuel cell)] may be added.

Herein, "about" means plus or minus 5% of any numerical value it qualifies.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Example 1

The embodiments of the invention described below elevates the catalytic activity of iron-based NPMCs by a factor>25 compared to the previously best reported activity (REFERENCE 7); high enough to equal Pt-based cathodes with loadings≤0.4 mgPt·cm$^{-2}$, at cell voltage≥0.9 V. The results presented below show that sufficiently active and inexpensive NPMCs for the ORR are possible. The present NPMCs will be useful for ORR in direct alcohol, formic acid and alkaline fuel cells.

Figure 1:
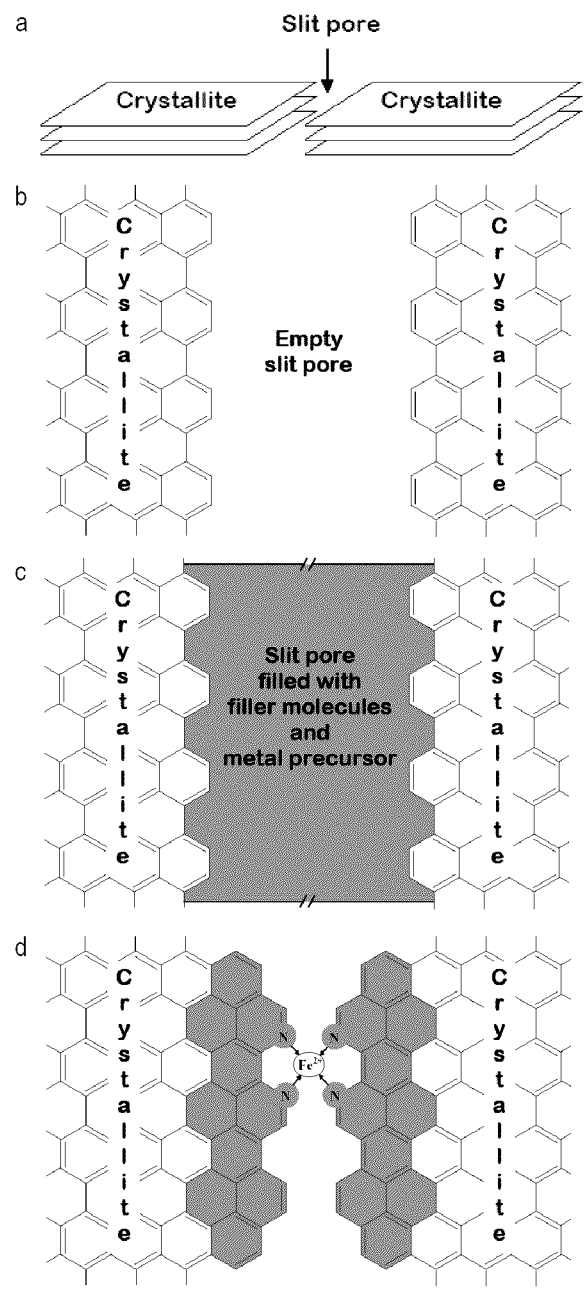
FIG. 1 is a schematic representation of catalytic site formation in the micropores of the carbon support: (a) Simplified 3-D view of a slit pore between two adjacent graphitic crystallites in the carbon support; (b) Plan view of an empty slit pore between two crystallites; (c) Plan view of a slit pore filled with pore-filler and metal precursor after planetary ballmilling; and (d) Plan view of the presumed catalytic site (incomplete) and graphene layer growth (shaded aromatic cycles) between two crystallites after pyrolysis.

To capitalize on the high micropore content of microporous carbon blacks and overcome the limitation due to their lack of disordered carbon, these micropores were filled with a mixture of pore-filler (PF) and iron precursor. Doing so creates a catalyst precursor that complies with the four factors required for producing active NPMCs, as described above. This innovative concept is illustrated in FIG. 1. To overcome the limitation of solubility and/or adsorbability associated with the impregnation method, planetary ballmilling was used to fill the pores of the microporous carbon support with various PFs and metal precursor.

In the present, the chosen microporous carbon black (micropore surface area 934 m²g⁻¹) and iron precursor used for all catalysts is Black Pearls 2000™ by Cabot (BP) and iron$^{II}$ acetate (FeAc), respectively. Two pore-fillers were used. The first, perylene-tetracarboxylic-dianhydride (PTCDA) is nitrogen free. The second, 1,10-phenanthroline (Phen) is N-bearing. For catalysts made using PTCDA, the N atoms necessary to form catalytic sites arise from its reaction with $NH_3$ during pyrolysis. For catalysts made using Phen, the pyrolysis was performed in either Ar or $NH_3$ as Phen already contains nitrogen. It is also worthy to note that Phen forms a complex with $Fe^{2+}$.

Catalyst Synthesis. Catalyst precursors refer to the powder mixtures prepared to be subsequently pyrolysed. All prepared catalyst precursors consist of a carbon support, a pore-filler and a non-noble metal precursor. These powder mixtures were prepared using the planetary ballmilling (PBM) method. The carbon support and the non-noble metal precursor used for all catalysts are BP and FeAc, respectively. The PFs used are PCTDA or Phen, which are represented as molecules (a) and (b) below respectively.

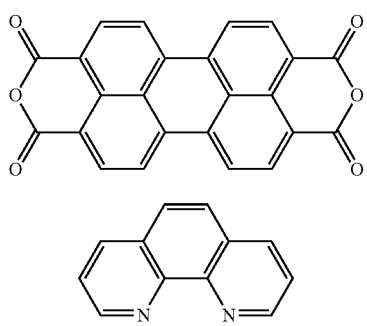

For catalyst precursors containing PTCDA, the three materials (BP, PTCDA and FeAc) were placed in a hardened steel vial (ca. 65 cm³) with 20 chrome steel balls of 0.25 inch diameter. Typically, ca. 1 g of powder is ballmilled at once. The ball-to-powder ratio was ca. 20:1. The vial was purged of air and filled with nitrogen using a glovebox. Once tightly sealed, the vial was placed in a planetary ballmiller (FRITSCH Pulverisette 7) to undergo 3 hours of ballmilling at 400 rpm. The resulting dry powder formed the catalyst precursor.

For catalyst precursors containing Phen, the Phen and FeAc were first mixed in a solution of ethanol to form a $[Fe(Phen)_3]^{2+}$ complex. This was evidenced by the deep red color that emerged from an otherwise clear solution. The carbon support, BP, was then added to the solution. This solution was stirred over a magnetic hotplate for ca. 2 hours and then placed in a drying oven overnight to be completely dried in air at ca. 90° C. Once dried the powder was placed in a steel vial and underwent the same ballmilling processing steps as described earlier for the catalyst precursor containing PCTDA. The resulting dry powder formed the catalyst precursor.

To become active ORR catalysts all catalyst precursors underwent one or two pyrolyses in either Ar or $NH_3$ depending on the PF used. The pyrolysis procedures to obtain the catalytic activities reported in Tables 2 and 3 are described below.

Methods. Surface area measurement of catalysts was performed with a Quantachrome Instruments Autosorb-1 and with $N_2$ as an adsorbate. Isotherm analysis was performed as in REFERENCE 19. Surface elemental analysis of catalysts was performed by X-ray photoelectron spectroscopy using a VG Escalab 200i instrument. The Al $K_\alpha$ line (1486.6 eV) was chosen as the X-ray source. The quantification of the elements was performed using Casa software. Bulk Fe content of the best catalyst was measured with neutron activation analysis at École Polytechnique de Montréal. MEAs were prepared using a Nafion 117 membrane and hot-pressing of the anode, cathode and membrane was done at ca. 140° C. for 40 seconds.

Electrochemical characterization. Two catalyst ink formulations were used. One formulation resulted in a Nafion-to-catalyst ratio (NCR) of 2 and another 1.5. For catalyst inks with a NCR of 2, 10 mg of catalyst was mixed in a glass vial with 435 µL of Nafion 5 wt % (Aldrich), 54 µL of ethanol and 136 µL of nanopure water. For catalyst inks with a NCR of 1.5, 10 mg of catalyst was mixed in a glass vial with 326 µL of Nafion 5 wt % (Aldrich), 163 µL of ethanol and 136 µL of nanopure water. In both cases the inks were first sonicated for 30 minutes, agitated in a vortex mixer for 15 minutes, sonicated once more for 15 minutes and finally agitated for 5 more minutes. These catalysts inks were then used to prepare the cathode for fuel cell testing.

Preparation of Cathodes and Anodes. The cathodes used for fuel cell testing were prepared using the catalyst inks described above. To obtain a loading of ca. 1 mg·cm-2 of catalyst, 71 µL of ink was deposited on a round uncatalysed 1.14 cm² substrate, or gas diffusion media (BASF ELAT). For some fuel cell tests, however, higher loadings were deposited. The anode used for all fuel cell tests performed with NPMCs at the cathode was the catalyst layer of a BASF ELAT substrate coated with 0.5 mg Pt·cm⁻², 20 wt % Pt/Vu. The active side (catalyst layer) of the substrate was brushed with a thin layer of Nafion 5 wt % solution (ca. 0.5 mg·cm⁻²). The anode and cathode were then placed in a vacuum oven at ca. 80° C. to dry for 1 hour. The mass of catalyst in the cathode was determined by subtracting the mass of the uncatalysed substrate from the dry mass of the catalyst-coated substrate and dividing the remainder by (NCR+1).

Fuel Cell Testing. Membrane electrode assemblies (MEAs) were tested in a single-cell test fuel cell (Electrochem Inc.) and the experiments were controlled with a potentiostat PARSTAT™ 2273 (Princeton Applied Research). Teflon gaskets were used at both the anode and cathode sides. The gasket thicknesses were chosen to obtain ca. 25% compression of the gas diffusion+catalyst layers.

First, the fuel cell and $H_2/O_2$ humidifier temperatures were raised and maintained to 80° C. and 105° C./95° C., respectively, under $N_2$ flows. Once set temperatures were reached, pure $H_2$ and $O_2$ were then fed for ca. 15 minutes. Back pressures were set to ca. 1 bar for both anode and cathode sides. Thus, the absolute pressure for both $H_2$ and $O_2$ is 1.5 bars (with ca. 0.5 bar partial pressure attributed to water vapor at ca. 80° C.). Flow rates for $H_2$ and $O_2$ were well above stoichiometric.

First an electrochemical impedance spectroscopy (EIS) measurement was made at open circuit voltage (OCV), with frequencies ranging from 50 kHz down to 10 Hz. Typical resistance values of ca. 0.2 Ω·cm² were obtained. A polarization curve was then recorded by scanning the cell voltage from OCV down to 0 V at a scan rate of 0.5 mVs⁻¹.

Results and Discussion. First, the effect of the wt % of PTCDA in the catalyst precursor was investigated. Four different wt % PTCDA (0, 25, 50, 75) were used with a constant nominal Fe loading of 0.2 wt %. Optimal volumetric activities of 1.8, 8.5, 22, and 27 A·cm⁻³ were obtained, respectively. The experimental conditions and corresponding fuel cell polarization curves are given in FIG. 5. Following these experiments, a pore filler loading of 50 wt % (PTCDA or Phen) was chosen to investigate the effect of nominal Fe loading in the catalyst precursor. Catalyst precursors made with PTCDA were pyrolysed in $NH_3$ and those made with Phen in Ar, both at 1050° C. While better volumetric activities were obtained with the PTCDA series (Table 1), the effect of a subsequent 5 minute pyrolysis in $NH_3$ for the Phen series was investigated. This subsequent pyrolysis amplified the volumetric activity of the Ar-pyrolysed Phen series up to 20 times. These amplified activities surpass those of the PTCDA series. Two factors were further optimized on the most active catalyst corresponding to 1 wt % nominal Fe content (84 $A \cdot cm^{-3}$, Table 1): (i) the mass loss during pyrolysis in $NH_3$ and (ii) the effect of the Nafion-to-catalyst ratio (NCR) in the cathode. The optimal mass loss and NCR were found to be ca. 30% and 1.5, respectively, leading to an increase in volumetric activity from 64 to 99 $A \cdot cm^{-3}$, much closer to the 2010 U.S. DOE performance target for ORR on NPMCs. Additional details on mass activity, mass loss during pyrolysis, micropore surface area and nitrogen content may be found in Table 2. Details of methods used for catalyst synthesis, MEA preparation and fuel cell testing may be found below.

TABLE 1

Catalytic activities for optimized catalysts. Activities at 0.8 V vs RHE obtained from fuel cell testing at 80° C. and under 1.5 bar $O_2$. Black Pearls 2000 ™ was used as the carbon support. The mass ratio of pore-filler to carbon support was 50/50. Catalyst loading for all tests was ca. 1 mg · $cm^{-2}$.
The Nafion-to-Catalyst ratio (NCR) was 2 unless otherwise noted.

| 1 st Pyrolysis Gas and (Temp.) | 2nd Pyrolysis Gas and (Temp.) | Pore-Filler | Nominal Fe Content (wt %) | Catalytic Activity $(A \cdot cm^{-3})^a$ |
|---|---|---|---|---|
| $NH_3$ (1050° C.) | — | PTCDA | 0.2 | 22 |
| $NH_3$ (1050° C.) | — | PTCDA | 0.5 | 24 |
| $NH_3$ (1050° C.) | — | PTCDA | 1.0 | 30 |
| Ar (1050° C.) | — | Phen | 0.2 | 2.8 |
| Ar (1050° C.) | — | Phen | 1.0 | 5.5 |
| Ar (1050° C.) | — | Phen | 4.1 | 1.4 |
| Ar (1050° C.) | $NH_3$ (950° C.) | Phen | 0.2 | $60^b$ |
| Ar (1050° C.) | $NH_3$ (950° C.) | Phen | 1.0 | $64^b$ |
| Ar (1050° C.) | $NH_3$ (950° C.) | Phen | 4.1 | $31^b$ |
| Ar (1050° C.) | $NH_3$ (950° C.) | Phen | 1.0 | $99^c$ (NCR 1.5) |

Figure 2:
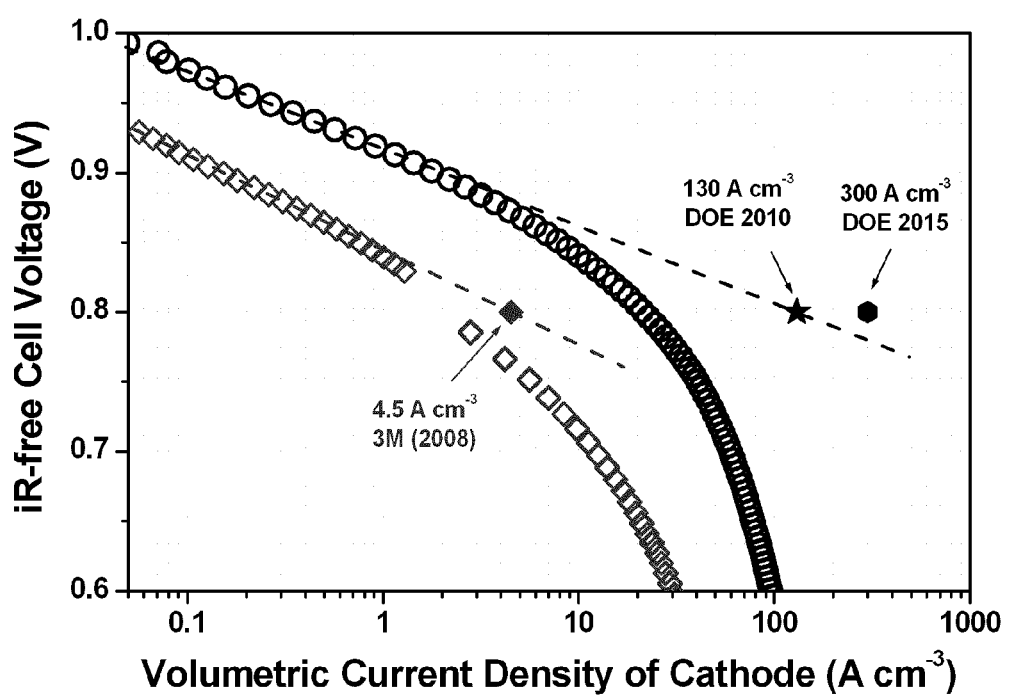
FIG. 2 shows the volumetric current density of best non-precious metal catalyst described below. Polarization curves (converted to $P_{O2}$ 1 bar, 100% RH, 80° C.) from $H_2$—$O_2$ fuel cell testing for cathodes made with the best non-precious metal catalyst (NPMC) below (hollow circles) and for reference purposes, the presumed previous best NPMC (REFERENCE 7) (hollow diamonds). A catalyst loading of ca. 1 mg·cm$^{-2}$ was used for both NPMC polarization curves. The actual Fe content in the catalyst from below is 1.7 wt %, resulting in a Fe loading of 17 µg·cm$^{-2}$. The volumetric (kinetic: free of diffusion or charge transport effects that are not related to the catalytic activity of the catalyst) current density at 0.8 V iR-free cell voltage is the intersection of the extended Tafel slope of the polarization curves (dashed lines) with the 0.8 V axis. Also included are the 2010 (filled star) and 2015 (filled hexagon) U.S. DOE performance targets for ORR on NPMCs, all at the reference conditions of PO2 1 bar, 100% RH and 80° C.

$^a$Converted from the activity measured under 1.5 bar $O_2$ absolute pressure to the reference pressure of 1 bar $O_2$ absolute pressure (details available in the Supplementary Information).
$^b$Unoptimized mass loss in $2^{nd}$ pyrolysis.
$^c$Optimized mass loss in $1^{st}$ and $2^{nd}$ pyrolysis FIG. 2 presents the polarization curves in terms of volumetric current density for our best NPMC and for the presumed best NPMC reported to date by Wood et al. (3M, 2008, REFERENCE 7). The U.S. DOE volumetric activity target for ORR on NPMCs is specified for 0.8 V iR-free cell voltage. As shown in FIG. 2, the kinetic activity (free of mass transport losses) of the NPMCs at 0.8 V iR-free cell voltage cannot be directly read from the polarization curves, but must instead be estimated by extrapolating the kinetically controlled Tafel slope observed at higher cell voltage. Our best NPMC shows an activity enhancement of more that 25 times that of the previously highest NPMC activity.

Figure 3:
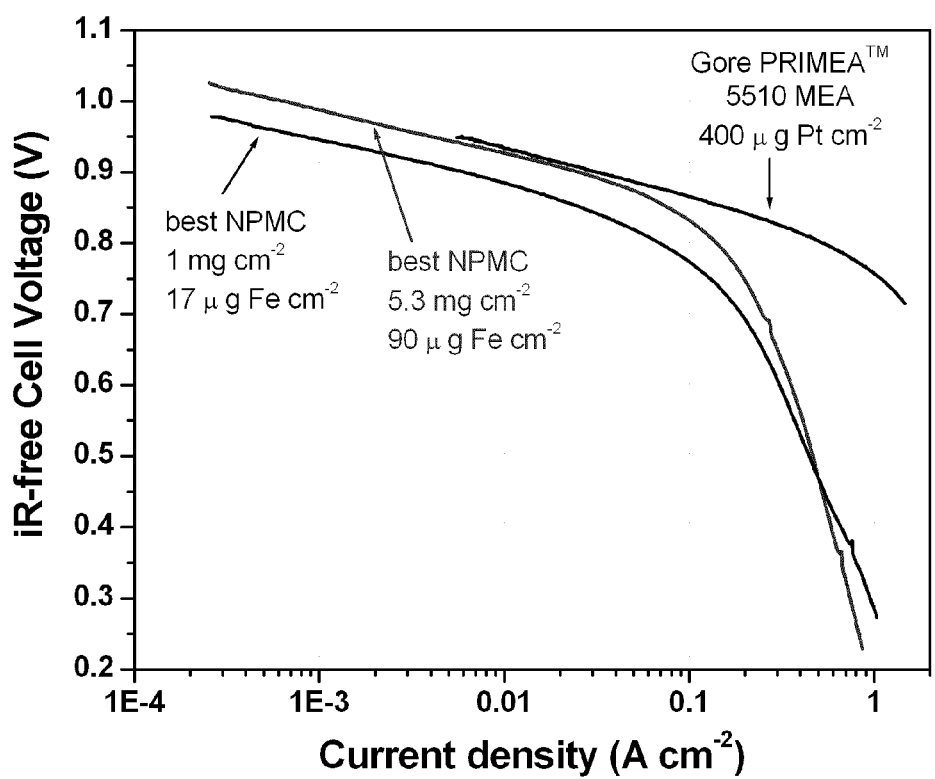
FIG. 3 is a comparison of best non-precious metal catalyst described below with a Pt-based catalyst. Polarization curves from $H_2$—$O_2$ fuel cell testing ($P_{O2}$ and $P_{H2}$ 1.5 bar, 100% RH, 80° C.) for cathodes made with the best non-precious metal catalyst below (two different catalyst loadings) and a ready-to-use Gore PRIMEA™ 5510 MEA from W. L. Gore & Associates with ca. 0.4 mg Pt cm$^{-2}$ at cathode and anode (top line as indicated). Flow rates for $H_2$ and $O_2$ were well above stoichiometric. The actual Fe content in our catalyst is 1.7 wt %, resulting in a Fe loading of 17 µg·cm$^{-2}$ for a catalyst loading 1 mg cm$^{-2}$.

To give prominence to the progress made by the NPMCs herein for ORR in PEM fuel cells, FIG. 3 shows two polarization curves, in terms of current density $(A \cdot cm^{-2})$, of the best NPMC produced herein (Table 1); one using a catalyst loading of 1.0 and the other 5.3 $mg \cdot cm^{-2}$. These polarization curves are compared with that of a Pt-based cathode catalyst (Gore PRIMEA™ 5510 MEA from W. L. Gore & Associates, ca. 0.4 $mg \cdot cm^{-2}$ Pt at cathode and anode) tested under the same conditions and test fuel cell. It can be seen in FIG. 3 that at 0.9 V iR-free cell voltage, within the kinetically controlled Tafel region for both polarization curves, increasing the loading of the NPMC by ca. 5 increases the current density of the cell by about the same factor. It can also be seen at 0.9V that the current density of the NPMC (5.3 $mg \cdot cm^{-2}$) is equal to that of the Pt-based catalyst. Although it may seem unfair to compare a NPMC loading of ca. 5 $mg \cdot cm^{-2}$ with a Pt loading of 0.4 $mg \cdot cm^{-2}$, the limiting factor for the Pt loading is cost, while no such factor exists for the low-cost NPMCs herein. However, for current densities>0.1 $A \cdot cm^{-2}$, the NPMC-based cathodes display lower performance than the Pt cathode (FIG. 3). This is probably caused by poor mass-transport properties that must be improved.

Steps followed to obtain the data appearing in Tables 2 and 3. Four series of catalyst were prepared using PCTDA as the pore-filler and Black Pearls 2000™ as the carbon support corresponding to 4 different PTCDA nominal concentrations; 0, 25, 50 and 75%. The nominal Fe content for all catalysts was 0.2 wt %. All pyrolyses were conducted either in Ar or in $NH_3$ (as specified in the Table captions) at 1050° C.

Figure 4:
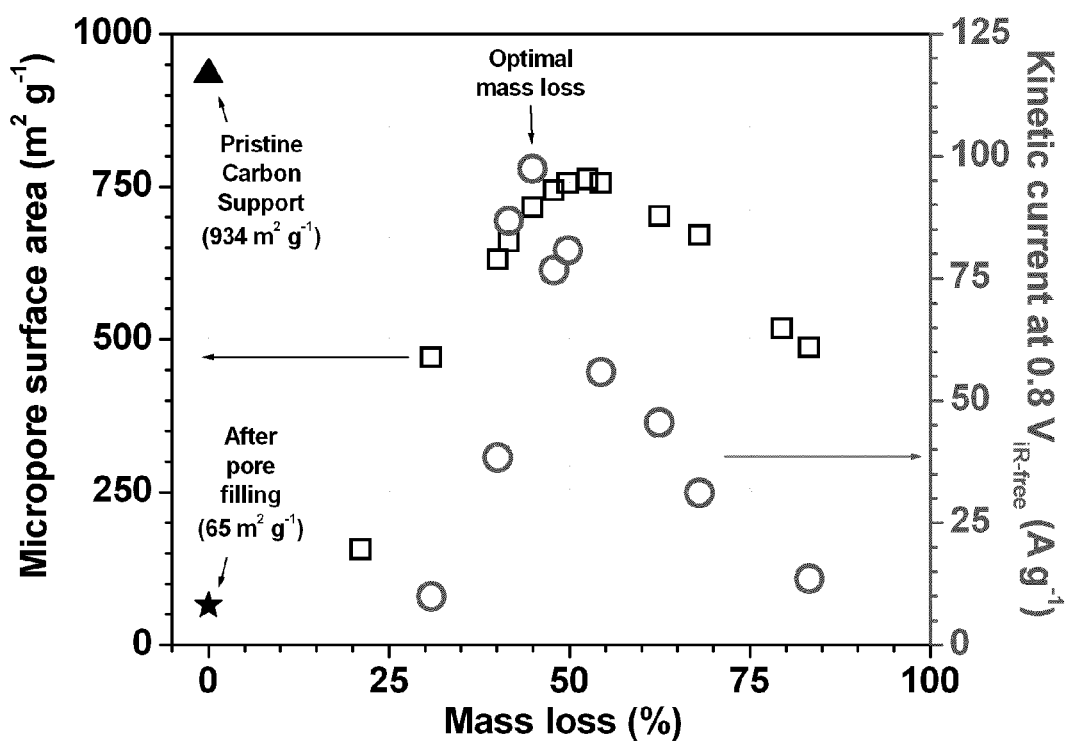
FIG. 4 shows the micropore surface area (hollow squares) and kinetic current at 0.8 $V_{iR\text{-}free}$ cell voltage obtained from fuel cell testing (hollow circles) vs mass loss (during pyrolysis) for catalysts produced with a 50% nominal concentration of PCTDA as the pore-filler and a nominal Fe content of 0.2 wt %. The kinetic current, in A·g$^{-1}$ at $0.8V_{iR\text{-}free}$ under 1.5 bar $O_2$ corresponding to the optimal mass loss upon pyrolysis, is reported in Table 2. Black Pearls 2000™ was used as the carbon support. Pyrolysis was conducted in $NH_3$ at 1050° C. Catalyst loading for all tests was ca. 1 mg·cm$^{-2}$. The Nafion-to-Catalyst ratio was 2. Micropore surface areas of pristine and pore-filled carbon support are represented by the filled triangle and filled star, respectively.

Series 1.

a. For each concentration of PCTDA several catalysts were produced by varying the pyrolysis time, each time resulting in a different mass loss.

b. Fuel cell tests were conducted for each catalyst in 1a. A Nafion-to-catalyst ratio of 2 was used for all tests. The kinetic currents at 0.8 $V_{iR\text{-}free}$ was determined by first converting the current from $A \cdot cm^{-2}$ to $A \cdot g^{-1}$, then finding the intersection of the extrapolated Tafel slope with the 0.8 $V_{iR\text{-}free}$ axis. An example of such kinetic values vs. mass loss is found in FIG. 4 (hollow circles) for the series of 10 catalysts prepared with 50% nominal PTCDA. The point corresponding to the maximum catalytic activity at the optimal mass loss is identified by an arrow in FIG. 4. This maximum activity (97 $A \cdot g^{-1}$) obtained in fuel cell testing at $0.8V_{iR\,free}$ vs RHE and 80° C. is reported in Table 2 for 50% nominal PTCDA. The polarization curve corresponding to this optimal catalyst for 50% nominal PTCDA is depicted by the second line from the top when looking at the left side of the graph in FIG. 5.

c. Micropore surface area measurements were performed for selected catalysts in 1. An example of such micropore surface area values vs. mass loss (corresponding to the 50% nominal PTCDA concentration series) is found in FIG. 4 (hollow squares). Note how the maximum kinetic current in this series coincides closely with the maximum micropore surface area, suggesting that micropores play an important role in the formation of catalytic sites.

Figure 5:
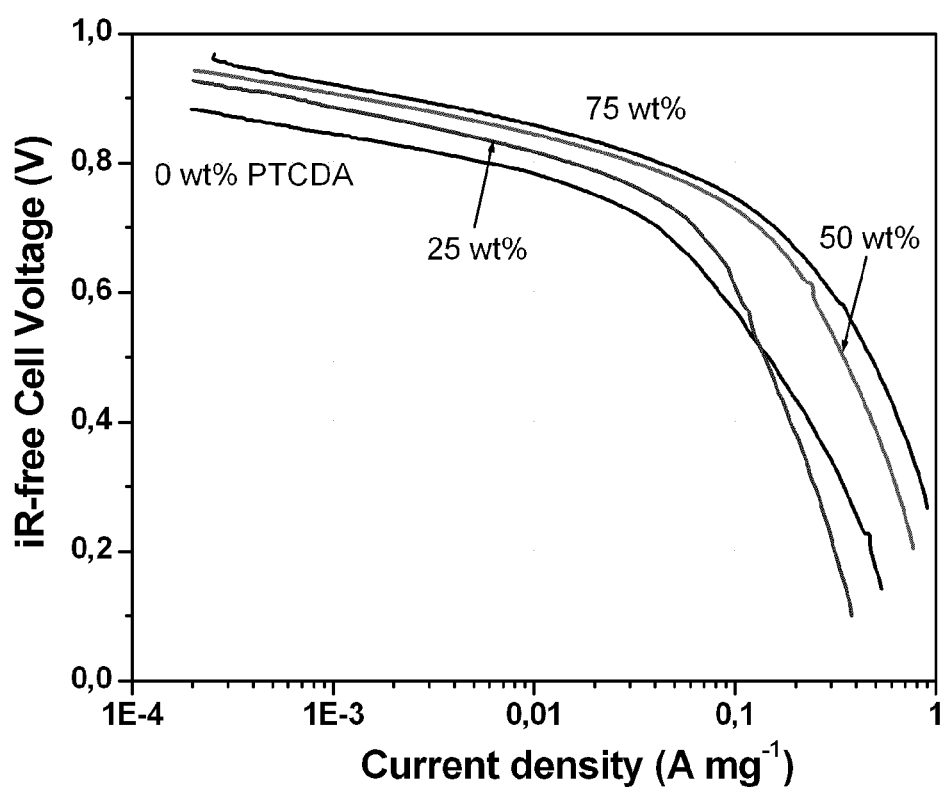
FIG. 5 shows polarization curves from fuel cell testing ($P_{O2}$ 1.5 bar, 100% RH, 80° C.) for catalysts produced with a nominal Fe content of 0.2 wt % and various nominal concentrations of PTCDA as the pore-filler: 0% (fourth line from the top when looking at the left side of the graphic, 25% (third line), 50% (second line) and 75% (first line). Black Pearls 2000™ was used as the carbon support. Pyrolysis was conducted in $NH_3$ at 1050° C. Catalyst loading for all tests was ca. 1 mg·cm$^{-2}$. The Nafion-to-Catalyst ratio was 2.

A summary of the optimal polarization curves (in $A \cdot cm^{-2}$) corresponding to each of the four nominal PTCDA concentration series described above is found in FIG. 5. All values of catalytic activity (in $A \cdot g^{-1}$, obtained in fuel cell testing at 0.8 VR-free vs. RHE and 80° C.), optimal mass loss, micropore surface area and surface N content for the four catalysts shown in FIG. 5 are listed in Table 2. Finally, 50% pore-filler concentration was chosen to conduct the remainder of all experiments herein.

TABLE 2

Catalytic activity (in A·g⁻¹, obtained in fuel cell testing at 0.8 $V_{IR-free}$ vs RHE and 80° C., under 1.5 bar O₂), optimal mass loss during pyrolysis, micropore surface area and N content for catalysts produced at optimal mass loss with different nominal concentrations of PCTDA as the pore-filler and a nominal Fe content of 0.2 wt %. Black Pearls 2000 ™ was used as the carbon support. Pyrolysis was conducted in NH₃ at 1050° C. Catalyst loading for all tests was ca. 1 mg·cm⁻². The Nafion-to-Catalyst ratio was 2. The volumetric activities under reference conditions of 1 bar O₂ are obtained by multiplying the catalytic activities measured at 1.5 bar O₂ (A·g⁻¹) by a factor of 0.231 as explained in the following section.

| Nominal PCTDA (wt %) | Catalytic Activity (A·g⁻¹) | Optimal Mass Loss (%) | Micropore Surface Area (m²g⁻¹) | N Content (at %) |
|---|---|---|---|---|
| 0 | 8 | 30 | 741 | — |
| 25 | 37 | 30 | 864 | 1.1 |
| 50 | 97 | 45 | 716 | 1.9 |
| 75 | 116 | 66 | 738 | 3.2 |

Series 2.

Three series of catalysts were produced using PCTDA as the pore-filler and Black Pearls 2000™ as the carbon support with a 50% PTCDA nominal concentration, corresponding to three different nominal Fe concentrations; 0.2 (already covered in 1.), 0.5 and 1 wt %. All pyrolyses were conducted in NH₃ at 1050° C.
  a. For each nominal Fe concentration several catalysts were produced by varying the pyrolysis time, each time resulting in a different mass loss.
  b. Fuel cell tests were conducted for each catalyst in 2a. The kinetic currents at 0.8 $V_{iR-free}$ were determined as in 1b. The kinetic currents, in A·g⁻¹ at 0.8$V_{iR-free}$ vs RHE and 80° C. corresponding to the optimal mass loss upon pyrolysis, are reported in Table 3.
  c. Micropore surface area measurements were performed for the optimal catalyst in each series.

All values of catalytic activity (in A·g⁻¹, obtained in fuel cell testing at 0.8 $V_{iR-free}$ vs RHE and 80° C.), optimal mass loss, micropore surface area and surface N content corresponding to the optimal catalyst from each nominal Fe concentration series are listed in Table 3 (rows 1-3).

Series 3.

The same steps as in 2 were followed for three more series of catalysts, this time produced using Phen as the pore-filler and Black Pearls 2000™ as the carbon support with a 50% Phen nominal concentration, corresponding to three different nominal Fe concentrations; 0.2, 1 and 4.1 wt %. All pyrolyses were conducted in Ar at 1050° C. The results are summarized in Table 3 (rows 4-6).

Series 4.

Optimal catalysts from each series (0.2, 1 and 4.1 wt % nominal Fe concentration) in 3. underwent a second pyrolysis, this time in NH₃ at 950° C. for 5 minutes. The results are summarized in Table 3 (rows 7-9).

The best catalyst from 4. (50% nominal Phen concentration and 1.0 wt % nominal Fe concentration pyrolysed first in Ar at 1050° C. then in NH₃ at 950° C.) was further optimized by determining the optimal duration of the $2^{nd}$ pyrolysis, or mass loss (ca. 30%) and the optimal Nafion-to-catalyst ratio (1.5). The results are summarized in Table 3 (row 10).

Conversion from the measured mass activity in A·g-1 under 1.5 bar O₂ to volumetric activity in A·cm-3 under reference conditions of 1 bar O₂. For comparison to DOE performance targets, the activities of the NPMCs are reported in A·cm⁻³ and under US D.O.E. reference conditions of 1 bar O₂ absolute pressure, 100% RH and 80° C. (REFERENCE 26). The measurements were performed in reference conditions, except for the O₂ pressure (1.5 bar). To convert the mass activity ($I_M$) measured under 1.5 bar O₂ absolute pressure to volumetric activity ($I_V^*$) under the reference conditions of 1 bar O₂ absolute pressure, Eq. I has been applied:

$$I_V^* = I_M \cdot \rho_{eff} \cdot \left(\frac{P_{O2}^*}{P_{O2}}\right)^{0.79} \cdot \left(\frac{P_{H2}^*}{P_{H2}}\right)^{\alpha_c/2} \qquad \text{Eq. 1}$$

where $I_M$ is the mass activity measured under the O₂ and H₂ pressures $P_{O2}$ and $P_{H2}$ (1.5 bar each), and $P_{O2}^*$ and $P_{H2}^*$ are the reference pressures (1 bar). A correction must therefore be made to account for the difference in O₂ pressure (thermodynamic and kinetic correction) and H₂ pressure (thermody-

TABLE 3

Catalytic activity (in A·g⁻¹, obtained in fuel cell testing at 0.8 $V_{iR-free}$ vs RHE and 80° C., under 1.5 bar O₂), optimal mass loss during pyrolysis, micropore surface area and N content for catalysts produced at optimal mass loss using various combinations of pyrolysis steps, pore-filler and nominal Fe content.

| | Pyrolysis Gas and Temp. | Pore-Filler | Nominal Fe Content (wt %) | Catalytic Activity (A·g⁻¹) | Optimal Mass Loss (%) | Micropore Surface Area (m²·g⁻¹) | N Content (at %) |
|---|---|---|---|---|---|---|---|
| 1-Step Pyrolysis | NH₃ (1050° C.) | PTCDA | 0.2 | 97 | 45 | 716 | 1.9 |
| | | | 0.5 | 106 | 50 | 736 | 1.7 |
| | | | 1.0 | 132 | 48 | 710 | 1.2 |
| | Ar (1050° C.) | Phen | 0.2 | 12 | 26 | 188 | 2 |
| | | | 1.0 | 24 | 27 | 242 | 2.6 |
| | | | 4.1 | 6 | 27 | 330 | 1.4 |
| 2-Step Pyrolysis | Ar + NH₃ (1050° C.) (950° C.) | Phen | 0.2 | 260 | 39* | — | 2.2 |
| | | | 1.0 | 277 | 35* | 497 | 2.4 |
| | | | 4.1 | 134 | 33* | 392 | 2.4 |
| | Ar + NH₃ (1050° C.) (950° C.) | Phen | 1.0 | 429 (NCR 1.5:1) | 47** | 580 | — |

Black Pearls 2000 ™ was used as the carbon support. The mass ratio of pore-filler to carbon support was 1. Catalyst loading for all tests was ca. 1 mg·cm⁻². The Nafion-to-Catalyst ratio (NCR) was 2 unless otherwise noted.
*Combined mass loss from two pyrolyses (does not represent optimal mass loss).
**Combined mass loss from two pyrolyses (represents optimal mass loss).

namic correction only) between reference and actual test conditions. $\rho_{eff}$ is the effective density of a carbon-based NPMC in the porous cathode. Since it has been shown for Pt/C catalysts that the kinetic activity at a fixed cell voltage is proportional to $P_{O2}^{0.79}$ and to $P_{H2}^{\alpha c/2}$ (where $\alpha_c$ is the cathodic transfer coefficient), the same law was assumed to apply to these NPMC (REFERENCE 48). From FIG. 3, a Tafel slope of 61 mV/dec is found for the most active NPMC in this study. This slope is nearly equal to that of Pt/C and is similar to most other NPMCs herein. The Tafel slope and $\alpha_c$ coefficient are related through Eq. 2:

$$Slope_{Tafel} = \frac{R \cdot T \cdot \ln 10}{\alpha_c \cdot F} \qquad (2)$$

A value for $\alpha_c$ of 1.15 is obtained based on a slope of 61 mV/dec. Theoretically, $\alpha_c$ cannot exceed a value of 1. However, assuming $\alpha_c=1$ in Eq. 1, the value of $I_V^*$ would only increase by ca 3%. Next, $\rho_{eff}$ was previously assumed to be 0.4 g·cm$^{-3}$ (REFERENCE 52). Our direct electrode thickness measurements confirm that the value of $\rho_{eff}$ is indeed very close to 0.4 g·cm$^{-3}$. This value has therefore been retained. With regard to porosity, the effective density of catalyst of 0.4 g·cm$^{-3}$ corresponds to ca 50% porosity for a Nafion-to-NPMC ratio of 1.5. From Eq. 1, it can be seen that multiplying the mass activity (in A·g$^{-1}$; measured under $P_{O2}$ and $P_{H2}$ of 1.5 bar, 100% RH and 80° C.) by 0.230 yields the volumetric activity (A·cm$^{-3}$) under the reference conditions ($P_{O2}$ and $P_{H2}$ 1 bar, 100% RH, 80° C.) defined by the U.S. DOE (REFERENCE 26).

In conclusion, the above demonstrates that sufficiently active and inexpensive non-precious metal catalysts for ORR are possible and therefore offer an alternative to Pt-based catalysts and provide a path toward the commercial viability of PEMFCs. These highly active and near-target-achieving iron-based electrocatalysts have been realized thanks to an innovative synthesis method based, in this case, on: (i) filling, by planetary ballmilling, the empty pores of a highly microporous carbon support (Black Pearls 2000™) with an N-bearing pore-filler (1,10 phenanthroline) and an iron precursor (iron$^{II}$ acetate), and (ii) pyrolysing this catalyst precursor first in Ar at 1050° C., then in NH$_3$ at 950° C.

Example 2

Other catalysts according to the present have been prepared by filling the micropores of a microporous support by planetary ballmilling with the following pore-fillers: PTCDA,

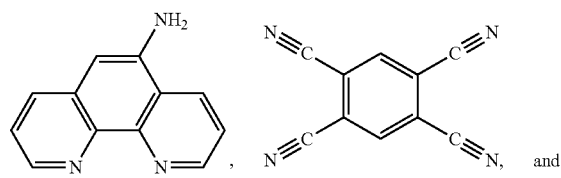

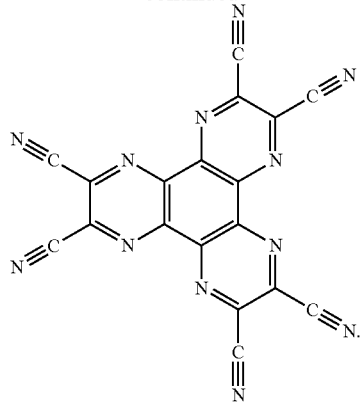

The loading of pore-filler ranged from 5 to 85 wt % based on the total weight of the catalyst.

Using BlackPearl™ as the microporous support, these catalysts showed satisfying catalytic activity for loading>50 wt %.

Catalysts have also been prepared using different microporous supports: BlackPearls™ (Cabot corp., BET area 1200 m$^2$ g-1, surface micropore 900 m$^2$ g$^{-1}$), and Ketjen-Black™ (Akzo Nobel, BET area 1400 m$^2$ g$^{-1}$, surface micropore 500 m$^2$ g$^{-1}$). Pyrolysis was performed in Ar at temperatures ranging from 500 to 1100° C. Interesting catalytic activities have been observed at temperatures T>800° C.

Using PTCDA as a pore-filler, both KetjenBlack™ and BlackPearls™ yielded catalysts with good activities.

Using KetjenBlack™ as a microporous support and PTCDA, hexacarbonitrile or tetracarbonitrile as a pore-filler also yielded catalysts with good activities.

Example 3

Catalysts similar to those of Example 1 were prepared with iron acetate, ferrocene and ferricyanide as non-noble metal precursors. These catalysts were prepared using 50 wt % of phenanthroline and 50 wt % of BlackPearls™ with a nominal Fe concentration of 0.2 wt %. Pyrolysis was performed under Ar or NH$_3$. The same good catalytic activities were obtained will all non-noble metal precursors.

Example 4

This example investigates the influence, on the kinetic activity of the catalyst, of (a) the type of pore-filler used, (b) the mass ratio of pore-filler in catalyst precursor, (c) the type of microporous carbon black used and (d) the nominal iron loading in the catalyst precursor. This expands on the above, where two types of pore-filler and one type of carbon black were used. Here, four types of pore-filler and two types of carbon blacks were used (see below). The pore-fillers used are (i) perylene-tetracarboxylic-dianhydride (PTCDA, N-free) (REFERENCE 53), (ii) perylene tetracarboxylic-diimide (PTCDI, N-bearing), (iii) 1,10 phenanthroline (phen, N-bearing) that complexes with iron$^{II}$ and has a structure similar to a part of the catalytic site (REFERENCE 31), and (iv) polyacrylonitrile (PAN, N-bearing). The latter has already been used as a nitrogen precursor by Yeager's group (REFERENCE 6). The microporous carbon blacks used are (i) Black Pearls 2000 (BP) from Cabot (BET area 1379 m$^2$ g$^{-1}$, micropore area 934 m$^2$ g$^{-1}$), and (ii) KetjenBlack EC600-JD (KB) from Azko-Nobel (BET area 1405 m$^2$ g$^{-1}$, micropore area 507 m² g⁻¹). The mass ratio of pore-filler and the nominal iron loading used in the catalyst precursors ranged from 0 to 90 wt % and 0.2 to 5 wt %, respectively.

Experimental

Catalyst synthesis. Catalyst precursors were prepared using planetary ballmilling. The iron precursor is iron$^{II}$ acetate (FeAc). The molecular structures of the various pore-fillers used are:

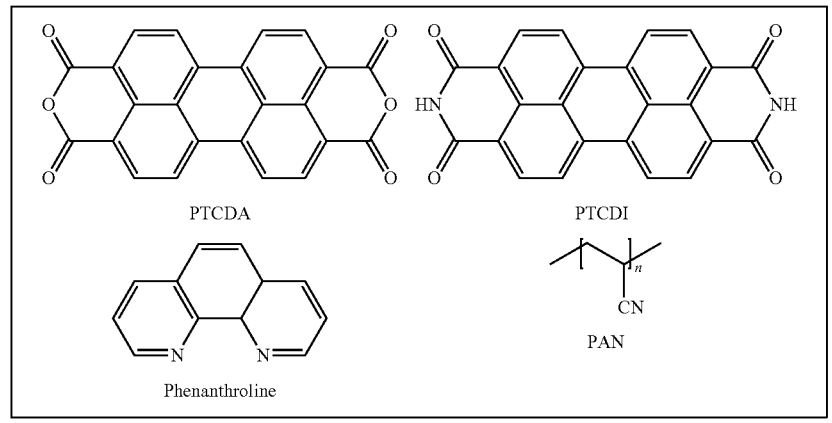

Planetary ballmilling was performed using ca. 1 g of carbon black and pore-filler mixture (the mass of each depending on the targeted pore-filler mass ratio) and FeAc (the mass depending on the targeted nominal iron loading in the catalyst precursor) was placed in a hardened steel vial (ca. 65 cm³) together with 20 chrome-steel balls of 0.25 inch diameter. The ball-to-powder mass ratio was 20:1. The vial was sealed in a nitrogen glove box. Once tightly sealed, the vial was placed in a planetary ballmiller (FRITSCH Pulverisette 7) to undergo 3 hours of ballmilling at 400 rpm. The resulting powder formed the catalyst precursor. When phen was used as the pore-filler, the phen and iron$^{II}$ (from FeAc) were first complexed by mixing both in a solution of ethanol to form a [Fe(Phen)₃]²⁺ complex. The carbon black was then added to the solution. This solution was stirred over low heat on a magnetic hotplate for 2 hours and then placed in a drying oven overnight to be completely dried in air at 90° C. Once dried, the powder was placed in a steel vial and underwent the same ballmilling processing steps as described above.

Two heat-treatment methods for the catalyst precursors were used to obtain active ORR catalysts. In method I, the catalyst precursor was pyrolysed in ammonia at 1050° C. A number of catalysts, each having a different mass loss were obtained by pyrolysing samples of the same catalyst precursor for various pyrolysis times. In Method II, the catalyst precursor was first pyrolysed in Ar at 1050° C. for 60 minutes. Then, the resulting powder was pyrolysed in NH₃ at 950° C. Here again, for the pyrolysis in NH₃, a number of catalysts, each having a different mass loss was obtained by pyrolysing samples of the same catalyst precursor for various pyrolysis times. The pyrolysis procedure is described in more detail above.

Electrochemical analysis. The catalyst ink for the fuel cell cathode was prepared with a Nafion-to-catalyst mass ratio (NCR) of 2 for all samples except for catalysts made with phen where the NCR value was 1.5. Details of the ink preparation and MEA assemblies may be found above. The fuel cell tests were performed at 80° C. cell temperature, with the humidifier for H₂ and O₂ at 105° C. and 95° C. respectively. The back pressures were 15 psig on both sides. The electrode geometric area was 1.14 cm². During the initial fuel cell warm-up period, nitrogen was fed to both electrodes. When the fuel cell reached 80° C., nitrogen was switched to hydrogen and oxygen at anode and cathode, respectively. The system was then held at OCV for 15 minutes before making an impedance measurement and recording the first polarization curve at a potential scan rate of 0.5 mV/sec using a Parstat 2273 potentiostat. The kinetic current at 0.8 V iR-free was estimated by extrapolating the Tafel slopes observed at higher potential. Conversion from the measured mass activity in A g⁻¹ at 1.5 bar O₂ and 1.5 bar H₂ to volumetric activity in A cm⁻³ at reference conditions of 1 bar is explained in detail above.

Physical analysis. Surface area measurement was performed with a Quantachrome Instruments Autosorb-1 and with N₂ as the adsorbate. Isotherm analysis was performed as in REFERENCE 19. Surface elemental analysis was performed via X-ray photoelectron spectroscopy using a VG Escalab 200i instrument and the monochromatic source was the Al Kα line (1486.6 eV). Quantification of the elements was performed using Casa XPS software.

RESULTS AND DISCUSSION

One-step pyrolysis (method I). The planetary ballmilling method is an effective method for filling the pores of a carbon black. While pristine Black Pearls 2000 (BP) has a micropore surface area of 934 m² g⁻¹, after ballmilling of a mixture of 50% BP and 50% PTCDA, the corresponding catalyst precursor had a micropore surface area of only 65 m² g⁻¹ (FIG. 6).

Figure 6:
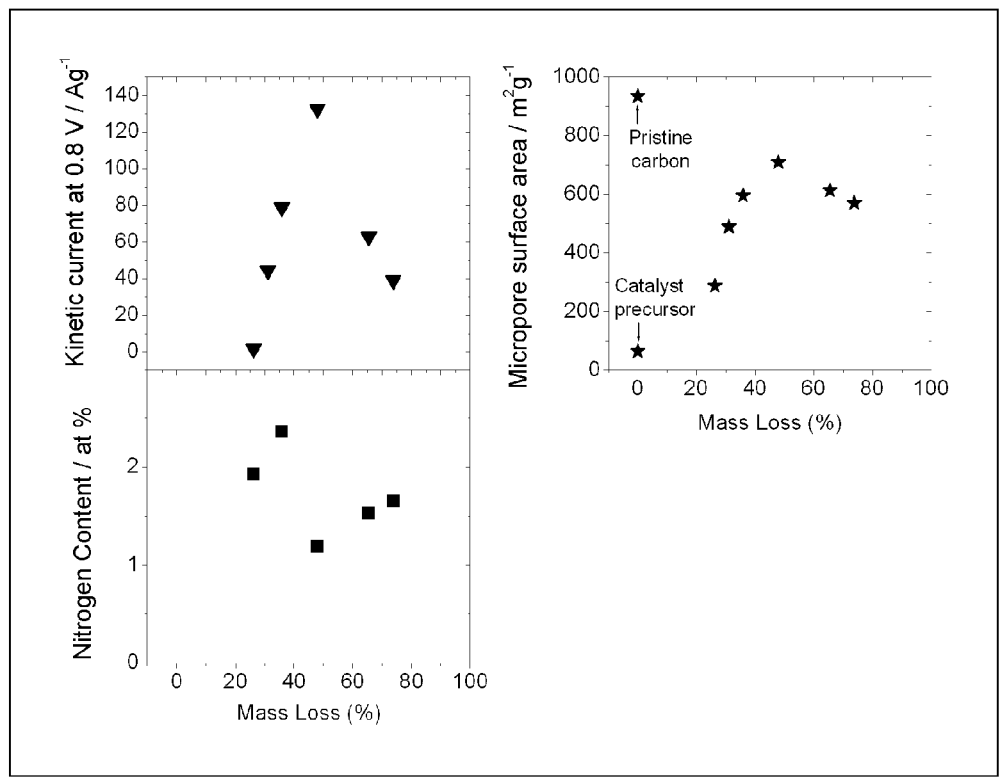
FIG. 6 shows the kinetic activity at 0.8V iR-free, nitrogen content, and micropore surface area for catalysts made with 50% BP, 50% PTCDA and 1 wt % of iron, pyrolysed using method I (1050° C. in $NH_3$).

The results shown in FIG. 6 were obtained for samples prepared with BP and PTCDA, with a PTCDA/BP mass ratio of 50/50 and 1 wt % iron nominal loading as FeAc. The mass loss is used as the x-axis variable in FIG. 6. Both the kinetic activity and the micropore surface area reach a maximum at a mass loss of 50% during the NH₃ pyrolysis. FIG. 6 shows that the activity correlates with the micropore surface area of the catalysts. Moreover, the maximum microporous surface area is ca. 700 m² g⁻¹, i.e. ca. 75% of the original micropore surface area found in pristine BP. The activity does not, however, correlate with the N content in the catalysts. Also, note that 50% mass loss corresponds to the mass ratio of pore-filler in the catalyst precursor. For other ratios of pore-filler/carbon black it was found that the maximum of activity also occurred at a mass loss corresponding to that of the mass ratio of the pore filler in the catalyst precursor. This is understandable since (i) micropores control the activity of such catalysts and (ii) the micropores arise from the etching by $NH_3$ of the pore-filler in the pores of the microporous carbon black.

For the remainder of this study, for each carbon black/pore-filler/Fe nominal loading combination, only the optimized catalyst is reported, i.e. the catalyst for which the mass loss in $NH_3$-pyrolysis is about equal to the pore-filler mass ratio in the catalyst precursor.

Figure 7:
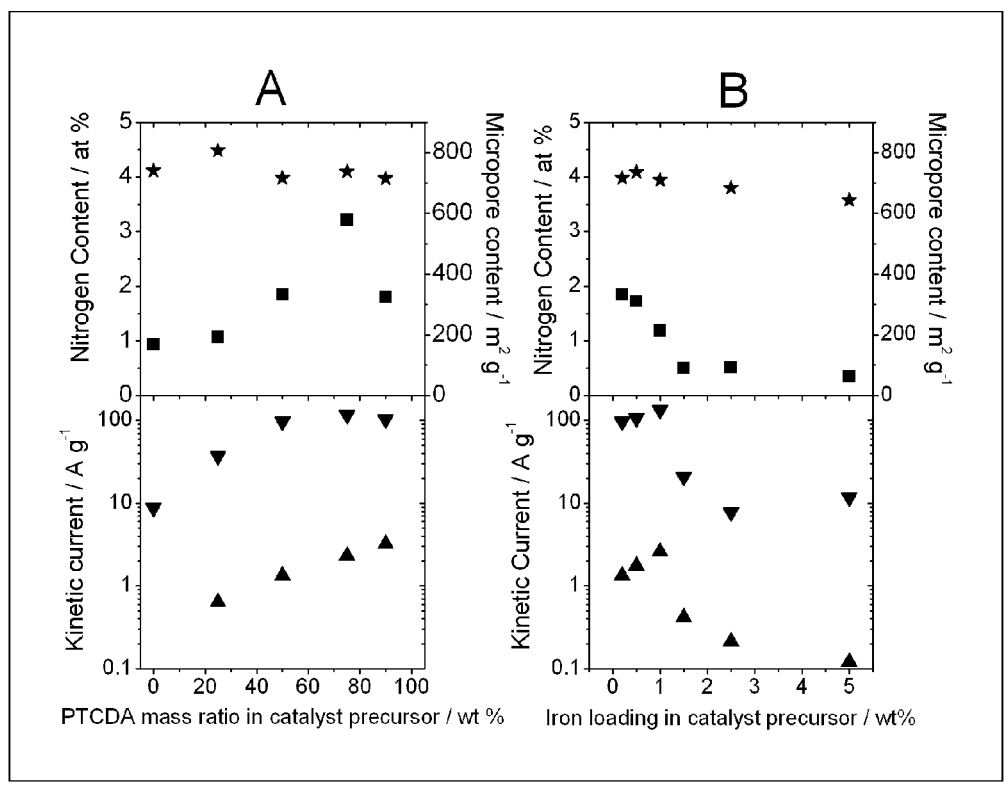
FIG. 7 shows the nitrogen content, micropore surface area and ORR kinetic activity in fuel cell for catalysts made using method I ($NH_3$ pyrolysis at 1050° C.) having (A) various mass ratios of PTCDA in the catalyst precursor and a fixed nominal iron loading of 0.2 wt %; and (B) fixed mass ratio of 50 wt % PTCDA in the catalyst precursor with various nominal iron loadings. Upper graphs: nitrogen content (squares, read on left hand-side Y-scale) and micropore surface area (stars, read on right hand-side Y-scale). Lower graphs: Kinetic current per mass of catalyst measured at 0.9V iR-free voltage (upright triangles) and 0.8V iR-free voltage (inverted triangles).

FIG. 7A shows the effect of the PTCDA loading in the catalyst precursor on three characteristics of the resulting catalysts: (i) the nitrogen content (ii) the micropore surface area and (iii) the kinetic current in a PEM fuel cell. These catalysts were prepared using method I and the nominal iron loading in the catalyst precursors was fixed at 0.2 wt %. The ORR activity in fuel cell appears to follow the same trend as nitrogen content with PTCDA loading, except for a PTCDA loading of 90%, where we observe a sudden decrease in nitrogen content, but no decrease in activity. The micropore surface area is roughly equal for all PTCDA loadings and corresponds in part to micropores created during pyrolysis due to the etching of pore-filler by ammonia. These observations might lead to the conclusion that the N content limits the activity. However, an alternative explanation is also possible. Although the nominal iron loading was fixed at 0.2 wt %, the final iron content in the catalysts of FIG. 7A changes: it may be estimated as 0.2 wt %·100/(100–X), where X is the PTCDA mass ratio in wt %. This calculation is based on the assumption that all iron content present in the catalyst precursor remains in the catalyst, while the PTCDA content is etched by $NH_3$. The retention of Fe during pyrolysis has been shown for a series of prior art catalysts (REFERENCE 21). For example, the catalyst in FIG. 7A made using 75 wt % PTCDA in the catalyst precursor contains ca. 0.8 wt % Fe while the one made with 20 wt % PTCDA contains ca. 0.25 wt % Fe. An increase of catalytic activity by increasing iron loading up to 1 wt % Fe will be shown below when discussing FIG. 7B. The activity of the series of catalysts in FIG. 7A can therefore be limited by either the N content or the Fe content or a combination of both.

In conclusion, for a nominal iron loading of 0.2 wt % (FIG. 7A), the highest kinetic activity was $116 A·g^{-1}$ at 0.8V iR-free and was obtained for a PTCDA loading of 75%. The optimal mass loss for this catalyst was 75%, i.e. the mass ratio of PTCDA in the catalyst precursor.

Next, with a fixed PTCDA mass ratio of 50% in the catalyst precursor, the nominal iron loading was varied from 0.2 to 5 wt %. For all nominal iron loadings, pyrolysis in $NH_3$ at 1050° C. were repeated until ca. 50 wt % mass loss was obtained; a value corresponding to the mass ratio of PTCDA in the catalyst precursor. Consequently, the micropore surface area for all these catalysts (see FIG. 7B, upper graph, stars) are almost exactly the same. The time of pyrolysis required to obtain 50% mass loss increased with increasing nominal iron loading. This is believed to be due to a decreasing reaction rate between PTCDA and $NH_3$ with increasing iron content (REFERENCE 54), and may be attributed to the competing decomposition reaction of $NH_3$ into $N_2$ and $H_2$ in the presence of excess iron (in the form of aggregates), as it is known to be an effective catalysts for such a reaction (REFERENCE 55).

The upper graph in FIG. 7B shows that the nitrogen content in the catalysts (square) decreases with nominal iron loading up to ca. 1 wt % and remains constant beyond this value. The decrease in N content with increase in nominal iron loading may be a result of the competing decomposition reaction of $NH_3$ described above. The ORR kinetic activity in fuel cell is shown in the lower graph in FIG. 7B. It increases with increasing iron loading up to 1 wt %, then decreases gradually with increasing nominal iron loading beyond 1 wt %.

Thus, the kinetic activity of catalysts with increasing nominal iron loading up to 1 wt % appears to be limited by iron content, while the low kinetic activity of catalysts with nominal iron loadings>1 wt % seem to be limited by low N content.

For the catalysts shown in FIG. 7B, the maximum kinetic activity obtained was $132 A·g^{-1}$ at 0.8V iR-free and corresponds to a nominal Fe loading of 1 wt %. This maximum kinetic activity is believed to be the result of an optimal balance between Fe and N content.

Figure 8:
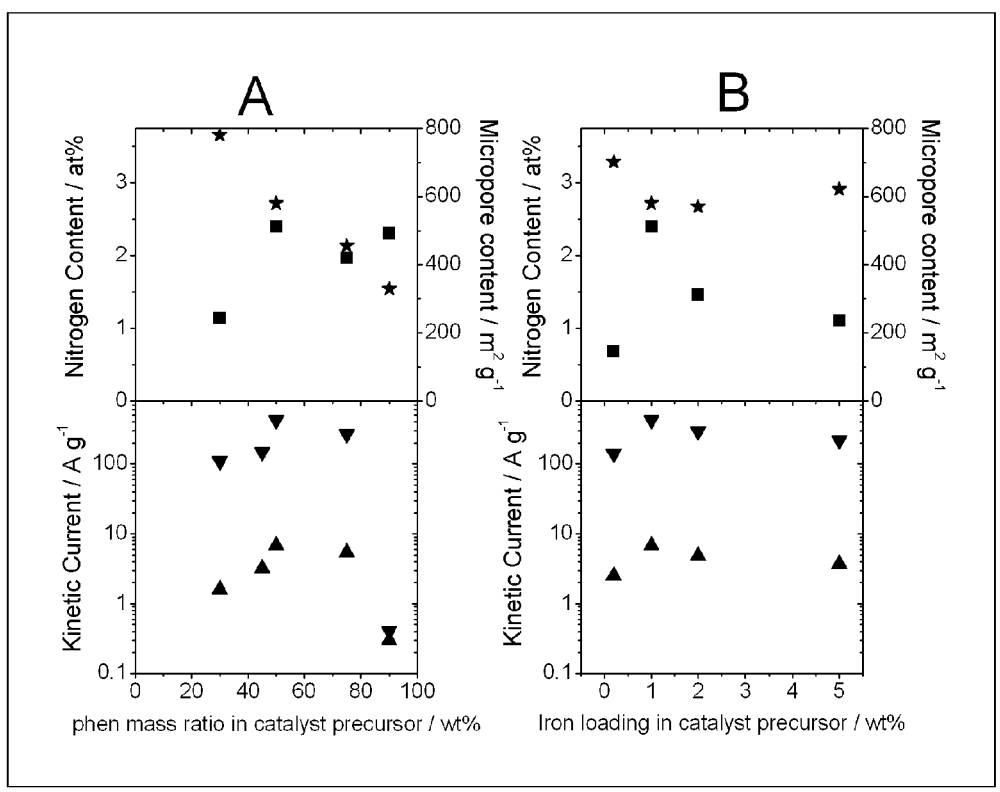
FIG. 8 shows the nitrogen content, micropore surface area and ORR kinetic activity in fuel cell for catalysts made using method II (Ar pyrolysis at 1050° C. for 60 min and then $NH_3$ pyrolysis at 950° C.) having (A) various mass ratios of phen in the catalyst precursor and a fixed nominal iron loading of 1 wt %; and (B) fixed mass ratio of 50 wt % phen in the catalyst precursor with various nominal iron loadings. Upper graphs: nitrogen content (squares, read on left hand-side Y-scale) and micropore surface area (stars, read on right hand-side Y-scale). Lower graphs: Kinetic current per mass of catalyst measured at 0.9V iR-free voltage (upright triangles) and 0.8V iR-free voltage (inverted triangles).

Two-steps pyrolysis (method II). The results obtained with method II (first pyrolysis in Ar, second pyrolysis in $NH_3$) are shown in FIG. 8. The pore-filler used in this case is phen, the carbon black and iron precursor are still BP and FeAc, respectively. FIG. 8 is laid out similarly to FIG. 7, except that phen is used as the pore-filler and method II was used for the pyrolysis steps (see experimental).

FIG. 8A shows how N content, microporous surface area and ORR kinetic activity in fuel cell varies with the phen mass ratio in the catalyst precursor. The iron loading was fixed at 1 wt %. As the phen mass ratio increases, the micropore surface area continually decreases while the nitrogen content initially increases (up to ca. 50 wt % phen) then levels-off. Unlike the catalysts presented in FIG. 7, where the sole N precursor is $NH_3$, here two N precursors are introduced, namely phen and $NH_3$. The ORR activity in fuel cell seems to be influenced by both the N content and the micropore surface area. The maximum kinetic activity for catalysts made with phen as the pore-filler was $429 A·g^{-1}$ at 0.8V iR-free using 50 wt % phen mass ratio (FIG. 8A, lower graph). The iron content of this catalyst is ca. 2 wt % (based on 1 wt % nominal iron loading and ca. 50 wt % mass loss during pyrolysis).

Next, the phen mass ratio was fixed at 50 wt % and the iron loading was varied from 0.2 to 5 wt % (FIG. 8B). The micropore surface area was roughly the same for different nominal iron loadings, but the N content behaves differently with a maximum of ca. 2.4 at % for a Fe loading of 1 wt %. The kinetic activity for these catalysts follows the same trend as the N content. If one were to plot the activity vs. N content, a linear relation would be observed.

Overall, for all catalysts presented in FIG. 8, the optimum Fe loading was 1 wt % for a 50 wt % phen mass ratio corresponding to a maximum kinetic activity of $429 A·g^{-1}$ at 0.8V iR-free. This activity is higher than the maximum activity for catalysts presented in FIG. 7 ($132 A·g^{-1}$ at 0.8V iR-free).

Effect of pore-filler used with method I (one-step pyrolysis). Catalysts made with three different pore-fillers (PTCDA, PTCDI and PAN) and heat treated in $NH_3$ at 1050° C. were investigated. The pore-filler mass ratio was kept constant at 50 wt % and the nominal iron loading was fixed at 1 wt %. Pyrolysis were repeated until 50 wt % mass loss was obtained for catalysts made with each pore-filler.

The first three rows in Table 4 represent the results for catalysts made with PTCDA, PTCDI and PAN, respectively. The nitrogen content and microporous surface areas of these catalysts are similar. The kinetic activity for the catalyst made with PTCDA is about twice as high as that made with PTCDI or PAN. For the latter, the apparent Tafel slope is higher than that of either the PTCDA- or the PTCDI-based catalyst (inset of FIG. 9). This results in a low kinetic activity at 0.8V iR-free for the PAN-based catalyst (Table 4). Thus, the comparison of the kinetic activities should preferably be done at 0.9V rather than at 0.8V.

Effect of microporous carbon black used with method I (one-step pyrolysis). Catalysts made with two different carbon blacks (BP and KB), but similar methods were investigated. The pore-filler and mass ratio used for both catalysts was PTCDA and 50 wt %, respectively. The iron loading was 1 wt %. The catalyst precursor prepared by planetary ball-milling was pyrolysed in $NH_3$ at 1050° C. Pyrolysis were repeated until 50 wt % mass loss was obtained for both catalysts. Rows 1 and 4 in Table 4 represent these two catalysts, where the only difference is the microporous carbon black used. The kinetic activity obtained with the catalyst using KB+PTCDA is lower than that obtained with BP+PTCDA, all other things equal. This lower kinetic activity is consistent with the lower microporous surface area and N content in the (KB+PTCDA)-based catalyst.

Figure 9:
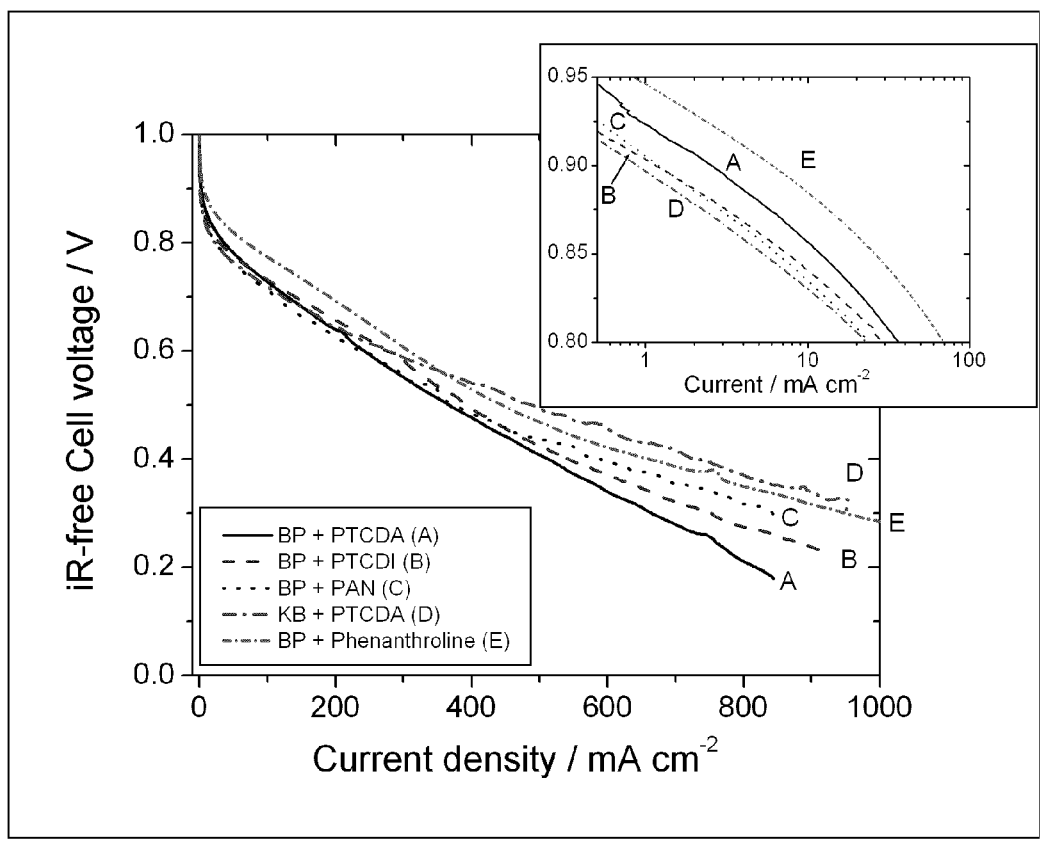
FIG. 9 shows the PEM fuel cell polarization curves for Fe-based catalysts made with various combinations of carbon black/pore-filler. In all cases the pore-filler mass ratio and nominal iron content was 50% and 1 wt %, respectively. Inset: iR-free voltage vs. current per cm$^{-2}$, semi-logarithmic plot. All catalyst precursors were subjected to one pyrolysis in $NH_3$ at 1050° C. except the catalyst made with BP+phen. The latter was subject to two pyrolyses, the 1$^{st}$ in Ar and the 2$^{nd}$ in ammonia (see experimental). $H_2/O_2$, 1 bar back pressure, 100% relative humidity, cell at 80° C., 1.14 cm$^2$ geometric area of electrode.

Activity and mass-transport: a necessary trade-off? While high kinetic activity at 0.8 or 0.9V iR-free is desirable, so is high power density at reasonably high cell voltage. Thus, good mass transport properties of electrodes made with these catalysts is also desirable. FIG. 9 presents the fuel cell polarization curves recorded with $O_2/H_2$ for all catalysts listed in Table 4. The catalyst loading was 1 mg·cm$^{-2}$. All catalysts were synthesized according to method I (one pyrolysis in $NH_3$ at 1050° C.) except for the catalyst BP+phen which was synthesized according to method II (first pyrolysis in Ar and the second in $NH_3$). FIG. 9 shows that the performance in fuel cell at 0.5 V iR-free does not necessarily correlate with the kinetic activity of the catalysts, measured at 0.8 or 0.9 V iR-free. The higher kinetic activity of the BP+phen catalyst does not translate into better performance at 0.5V. The KB+PTCDA catalyst, for example, has much lower activity at 0.8V or 0.9V iR-free, but better performance than the BP+phen catalyst at 0.5V iR-free.

TABLE 4

Nitrogen content, microporous surface area, and kinetic activity at 0.9 V (in A g$^{-1}$) and 0.8 V iR-free (in A g$^{-1}$ and A cm$^{-3}$), for catalysts made with various combinations of carbon black/pore-filler. In all cases the pore-filler mass ratio and nominal iron content was 50% and 1 wt %, respectively.

| Catalyst precursor | Nitrogen at % | Micropores m$^2$ g$^{-1}$ | Current at 0.9 V A g$^{-1}$ | Current at 0.8 V A g$^{-1}$ | Current at 0.8 V A cm$^{-3}$ |
|---|---|---|---|---|---|
| BP + PTCDA | 1.2 | 710 | 2.6 | 132 | 30 |
| BP + PTCDI | 0.7 | 802 | 1.2 | 76 | 17 |
| BP + PAN | 1.1 | 821 | 1.2 | 36 | 8 |
| KB + PTCDA | 0.6 | 582 | 0.9 | 37 | 8 |
| BP + Phen | 2.4 | 580 | 6.8 | 429 | 99 |

Although the present invention has been described hereinabove by way of specific embodiments thereof, it can be modified, without departing from the spirit and nature of the subject invention as defined in the appended claims.

REFERENCES

1. Jasinski, R. A new fuel cell cathode catalyst. *Nature* 201, 1212-1213 (1964).
2. Dodelet, J. P. in N4-Macrocyclic Metal Complexes (eds. Zagal, J. H., Bedioui, F. & Dodelet, J. P.) 83-147 (Spinger, N.Y., 2006).
3. Koslowski, U. I., Abs-Wurmbach, I., Fiechter, S. & Bogdanoff, P. Nature of the Catalytic Centers of Porphyrin-Based Electrocatalysts for the ORR: A Correlation of Kinetic Current Density with the Site Density of Fe—N$_4$ Centers. *J. Phys. Chem. C* 112, 15356-15366 (2008).
4. Maruyama, J., Okamura, J., Miyazaki, K., Uchimoto, Y. & Abe, I. Hemoglobin pyropolymer used as a precursor of a noble-metal-free fuel cell cathode catalyst. *Journal of Physical Chemistry C* 112, 2784-2790 (2008).
5. Ziegelbauer, J. M. et al. Direct spectroscopic observation of the structural origin of peroxide generation from co-based pyrolyzed porphyrins for ORR applications. *Journal of Physical Chemistry C* 112, 8839-8849 (2008).
6. Gupta, S., Tryk, D., Bae, I., Aldred, W. & Yeager, E. Heat-treated polyacrylonitrile-based catalysts for oxygen electroreduction. *Journal of Applied Electrochemistry* 19, 19-27 (1989).
7. Wood, T. E., Tan, Z., Schmoeckel, A. K., O'Neill, D. & Atanasoski, R. Non-precious metal oxygen reduction catalyst for PEM fuel cells based on nitroaniline precursor. *Journal of Power Sources* 178, 510-516 (2008).
8. Yuasa, M. et al. Modifying carbon particles with polypyrrole for adsorption of cobalt ions as electrocatatytic site for oxygen reduction. *Chemistry of Materials* 17, 4278-4281 (2005).
9. Subramanian, N. P. et al. Studies on Co-based catalysts supported on modified carbon substrates for PEMFC cathodes. *Journal of Power Sources* 157, 56-63 (2006).
10. Easton, E. B., Bonakdarpour, A. & Dahn, J. R. Fe—C—N oxygen reduction catalysts prepared by combinatorial sputter deposition. *Electrochemical and Solid State Letters* 9, A463-A467 (2006).
11. Yang, R. Z., Bonakdarpour, A., Easton, E. B., Stoffyn-Egli, P. & Dahn, J. R. Co—C—N oxygen reduction catalysts prepared by combinatorial magnetron sputter deposition. *Journal of the Electrochemical Society* 154, A275-A282 (2007).
12. Maruyama, J. & Abe, I. Structure control of a carbon-based noble-metal-free fuel cell cathode catalyst leading to high power output. *Chemical Communications*, 2879-2881 (2007).
13. Garsuch, A., MacIntyre, K., Michaud, X., Stevens, D. A. & Dahn, J. R. Fuel cell studies on a non-noble metal catalyst prepared by a template-assisted synthesis route. *Journal of the Electrochemical Society* 155, 6953-B957 (2008).
14. Schilling, T. & Bron, M. Oxygen reduction at Fe—N-modified multi-walled carbon nanotubes in acidic electrolyte. *Electrochimica Acta* 53, 5379-5385 (2008).
15. Sirk, A. H. C., Campbell, S. A. & Birss, V. I. Effect of preparation conditions of sol-gel-derived Co—N—C-based catalysts on ORR activity in acidic solutions. *Journal of the Electrochemical Society* 155, B592-B601 (2008).
16. Maruyama, J., Fukui, N., Kawaguchi, M. & Abe, I. Application of nitrogen-rich amino acids to active site generation in oxygen reduction catalyst. *Journal of Power Sources* 182, 489-495 (2008).
17. Nallathambi, V., Lee, J.-W., Kumaraguru, S. P., Wu, G. & Popov, B. N. Development of high performance carbon composite catalyst for oxygen reduction reaction in PEM Proton Exchange Membrane fuel cells. *Journal of Power Sources* 183, 34-42 (2008).
18. Jaouen, F., Charreteur, F. & Dodelet, J. P. Fe-based catalysts for oxygen reduction in PEMFCs—Importance of the disordered phase of the carbon support. *Journal of the Electrochemical Society* 153, A689-A698 (2006).
19. Jaouen, F., Lefèvre, M., Dodelet, J. P. & Cai, M. Heat-treated Fe/N/C catalysts for 0-2 electroreduction: Are active sites hosted in micropores? *Journal of Physical Chemistry B* 110, 5553-5558 (2006).
20. Jaouen, F. & Dodelet, J. P. Non-noble electrocatalysts for 0-2 reduction: How does heat treatment affect their activity and structure? Part I. Model for carbon black gasification by NH$_3$: Parametric calibration and electrochemical validation. *Journal of Physical Chemistry C* 111, 5963-5970 (2007).
21. Jaouen, F., Serventi, A. M., Lefevre, M., Dodelet, J. P. & Bertrand, P. Non-noble electrocatalysts for 0-2 reduction: How does heat treatment affect their activity and structure? Part II. Structural changes observed by electron microscopy, Raman, and mass spectroscopy. *Journal of Physical Chemistry C* 111, 5971-5976 (2007).
22. Jaouen, F., Marcotte, S., Dodelet, J. P. & Lindbergh, G. Oxygen reduction catalysts for polymer electrolyte fuel cells from the pyrolysis of iron acetate adsorbed on various carbon supports. *Journal of Physical Chemistry B* 107, 1376-1386 (2003).
23. Charreteur, F., Jaouen, F., Ruggeri, S. & Dodelet, J. P. Fe/N/C non-precious catalysts for PEM fuel cells: Influence of the structural parameters of pristine commercial carbon blacks on their activity for oxygen reduction. *Electrochimica Acta* 53, 2925-2938 (2008).
24. Jaouen, F. & Dodelet, J. P. Average turn-over frequency of 0-2 electro-reduction for Fe/N/C and Co/N/C catalysts in PEFCs. *Electrochimica Acta* 52, 5975-5984 (2007).
25. Lefèvre, M. & Dodelet, J.-P. Fe-based electrocatalysts made with microporous pristine carbon black supports for the reduction of oxygen in PEM fuel cells. *Electrochimica Acta* 53, 8269-8276 (2008).
26. *Hydrogen, Fuel Cells & Infrastructure Technologies Program, Multi-Year Research, Development and Demonstration Plan.* (US DOE, 2007); <http://www1.eere.energy.govihydrogenandfuelcells/mypp/pdfs/fuel_cells.pdf>.
27. Villers, D., X. Jacques-Bedard, and J. P. Dodelet, *Fe-based catalysts for oxygen reduction in PEM fuel cells—Pretreatment of the carbon support.* Journal of the Electrochemical Society, 2004. 151(9): p. A1507-A1515.
28. Lefevre, M., et al., ACTIVITY FOR O2 REDUCTION OF HEAT-TREATED FE/N/C CATALYSTS PREPARED WITH CARBON BLACK MODIFIED BY NITROGEN-BEARING FUNCTIONALITIES, in ECS, T. Fuller, et al., Editors. 2006, The electrochemical Society: Cancun. p. 201-210.
29. He, P., et al., *Oxygen reduction catalysts for polymer electrolyte fuel cells from the pyrolysis of various transition metal acetates adsorbed on 3,4,9,10-perylenetetracarboxylic dianhydride.* Journal of New Materials for Electrochemical Systems, 1999. 2(4): p. 243-251.
30. Lefevre, M., J. P. Dodelet, and P. Bertrand, *Molecular oxygen reduction in PEM fuel cell conditions: ToF-SIMS analysis of Co-based electrocatalysts.* Journal of Physical Chemistry B, 2005. 109(35): p. 16718-16724.
31. Lefèvre, M., J. P. Dodelet, and P. Bertrand, *O2 reduction in PEM fuel cells: Activity and active site structural information for catalysts obtained by the pyrolysis at high temperature of Fe precursors.* Journal of Physical Chemistry B, 2000. 104(47): p. 11238-11247.
32. Lalande, G., et al., *Catalytic activity and stability of heat-treated iron phthalocyanines for the electroreduction of oxygen in polymer electrolyte fuel cells. Journal of power sources,* 1996. 61(1-2): p. 227-237.
33. Faubert, G., et al., *Heat-treated iron and cobalt tetraphenylporphyrins adsorbed on carbon black: Physical characterization and catalytic proprieties of these materials for the reduction of oxygen in polymer electrolyte fuel cells.* electrochimica acta, 1996. 41(10): p. 1689-1701.
34. Lalande, G., et al., *Physical, chemical and electrochemical characterization of heat-treated tetracarboxylic cobalt phthalocyanine adsorbed on carbon black as electrocatalyst for oxygen reduction in polymer electrolyte fuel cells.* electrochimica acta, 1995. 40(60): p. 2635-2646.
35. Xia, D., et al., *Methanol-tolerant MoN electrocatalyst synthesized through heat treatment of molybdenum tetraphenylporphyrin for four-electron oxygen reduction reaction.* Journal of Power Sources, 2008. 177(2): p. 296-302.
36. Wang, P., et al., *Oxygen reduction on the electrocatalysts based on pyrolyzed non-noble metal/poly-o-phenylenediamine/carbon black composites: New insight into the active sites.* Journal of Electroanalytical Chemistry, 2007. 611(1-2): p. 87-95.
37. Kiros, Y., *Metal Porphyrins for Oxygen Reduction in PEMFC.* International Journal of ELECTROCHEMICAL SCIENCE, 2007. 2: p. 285-300.
38. Zhong, H. X., et al., *A novel non-noble electrocatalyst for PEM fuel cell based on molybdenum nitride.* Electrochemistry Communications, 2006. 8(5): p. 707-712.
39. Sawai, K. and N. Suzuki, *Heat-treated transition metal hexacyanometallates as electrocatalysts for oxygen reduction insensitive to methanol.* Journal of the Electrochemical Society, 2004. 151(5): p. A682-A688.
40. Bouwkamp-Wijnoltz, A. L., et al., *Electrochemical reduction of oxygen: an alternative method to prepare active CoN4 catalysts.* electrochimica acta, 1999. 45(3): p. 379-386
41. Gouerec, P., et al., *Oxygen reduction in acid media catalysed by heat treated cobalt tretraazaannulene supported on an active charcoal: correlations between the performances after longevity tests and the active site configuration as seen by XPS and ToFs-SIMS.* Journal of Electoanalytical Chemistry, 1997. 422(1-2): p. 61-75.
42. Gouerec, P., M. Savy, and J. Riga, *Oxygen reduction in acidic media catalyzed by pyrolyzed cobalt macrocycles dispersed on an active carbon: the importance of the content of oxygen surface groups on the evolution of the chelate structure during the heat treatment.* electrochimica acta, 1998. 43(7): p. 743-753.
43. Okada, T., et al., *A comparative study of organic cobalt complex catalysts for oxygen reduction in polymer electrolyte fuel cells.* Journal of Inorganic and Organometallic Polymers, 1999. 9(4): p. 199-219.
44. Bezerra, C. W. B., et al., *A review of heat-treatment effects on activity and stability of PEM fuel cell catalysts for oxygen reduction reaction.* Journal of Power Sources, 2007. 173(2): p. 891-908.
45. Bezerra, C. W. B., et al., *A review of Fe-N/C and Co-N/C catalysts for the oxygen reduction reaction.* Electrochimica Acta, 2008. 53(15): p. 4937-4951.
46. Wang, B., *Recent development of non-platinum catalysts for oxygen reduction reaction.* Journal of Power Sources, 2005. 152(1): p. 1-15.
47. Bashyam, R. & Zelenay, P. A class of non-precious metal composite catalysts for fuel cells. *Nature* 443, 63-66 (2006).
48. Neyerlin, K. C., Gu, W. B., Jorne, J. & Gasteiger, H. A. Determination of catalyst unique parameters for the oxygen reduction reaction in a PEMFC. *Journal of the Electrochemical Society* 153, A1955-A1963 (2006).
49. Garsuch, A. D'Eon, R. Dahn, T., Klepel, 0., Garsuch, R. R., Dahn, J. R. Oxygen reduction behavior of highly porous non-noble metal catalysts prepared by a template-assisted synthesis route, Journal of the Electrochemical Society, Volume 155, Issue 3, 2008, Pages B236-B243

50. J. A. R. van veen, C. Visser, oxygen reduction on monomeric transition metal phthalocyanines in acid electrolyte, Electrochimica Acta vol. 25, pp 921-928 (1979)
51. Costamagna, J. A., M. A. Isaacs, M. J. Aguirre, G. Ramirez, and I. Azocar in $N_4$-Macrocyclic Metal Complexes (eds. Zagal, J. H., Bedioui, F. & Dodelet, J. P.) 191-254 (Springer, New-York, 2006)
52. H. A. Gasteiger, S. S. Kocha, B. Sompalli, F. T. Wagner, Activity benchmarks and requirements for Pt, Pt-alloy, and non-Pt oxygen reduction catalysts for PEMFCs, *Applied Catalysis B: Environmental* 56, pp. 9-35.
53. G. Faubert, R. Côté, J. P. Dodelet, M. Lefèvre and P. Bertrand, Electrochim. Acta, 44, 2589 (1999).
54. Z. B. Zhao, W. Li, J. S. Qui and B. Q. Li, Fuel, 82, 1839 (2003).
55. C. Xu, N. Tsubouchi, H. Hashimoto and Y. 0, fuel, 84, 1957 (2005).
56. F. Jaouen and J. P. Dodelet, J. Phys. Chem. C 113, 15422-15432 (2009).
57. G. Lalande, R. Me, D. Guay, J. P. Dodelet, L. T weng, P. Bertrand, Electrochim. Acta 42, 1379-1388 (1997).

The invention claimed is:

1. A catalyst precursor comprising:
   a. a microporous support;
   b. a non-noble metal precursor; and
   c. a pore-filler,
wherein the micropores of the microporous support are filled with the pore-filler and the non-noble metal precursor so that the micropore surface area of the catalyst precursor is substantially smaller at about 75% or less than the micropore surface area of the support when the pore-filler and the non-noble metal precursor are absent.

2. The catalyst precursor of claim 1, wherein at least one of the microporous support, the non-noble metal precursor or the pore-filler is a nitrogen precursor.

3. The catalyst precursor of claim 1, wherein the microporous support is highly microporous and/or carbon-based.

4. The catalyst precursor of claim 1, wherein the non-noble metal precursor is a precursor of iron or cobalt.

5. The catalyst precursor of claim 4 having an iron loading of about 0.2 wt % or more based on the total weight of the catalyst precursor.

6. The catalyst precursor of claim 1, wherein the non-noble metal precursor is a salt of a non-noble metal or an organometallic complex of a non-noble metal.

7. The catalyst precursor of claim 1, wherein the non-noble metal precursor and the pore-filler are the same materials.

8. The catalyst precursor of claim 1, wherein the pore-filler comprises a polycyclic structure.

9. The catalyst precursor of claim 1, wherein a pore-filler/microporous support mass ratio is 50:50.

10. The catalyst precursor of claim 1, wherein the pore-filler and the non-noble metal precursor are selected such that, upon pyrolysis, the micropore surface area of the catalyst precursor increases, with the proviso that the pyrolysis is performed in the presence of a gas that is a nitrogen precursor when the microporous support, the non-noble metal precursor and the pore-filler are not nitrogen precursors.

11. The catalyst precursor of claim 10, wherein the micropore surface area of the catalyst precursor after pyrolysis is at least about 50% of the micropore surface area of the support when the pore-filler and the non-noble metal precursor are absent.

12. The catalyst precursor of claim 10, wherein a mass loss during pyrolysis is about equal to a pore-filler loading in the catalyst precursor before pyrolysis.

13. The catalyst precursor of claim 10 having a nitrogen content of about 0.5 wt % or more after pyrolysis based on the total weight of the catalyst precursor after pyrolysis.

* * * * *

UNITED STATES PATENT AND TRADEMARK OFFICE
CERTIFICATE OF CORRECTION

PATENT NO. : 8,580,704 B2  Page 1 of 1
APPLICATION NO. : 13/127744
DATED : November 12, 2013
INVENTOR(S) : Lefèvre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 65 days.

Signed and Sealed this
Twenty-second Day of September, 2015

Michelle K. Lee
*Director of the United States Patent and Trademark Office*